(12) United States Patent
Patil et al.

(10) Patent No.: US 8,791,948 B2
(45) Date of Patent: Jul. 29, 2014

(54) METHODS AND SYSTEMS TO GENERATE GRAPHICAL REPRESENTATIONS OF RELATIONSHIPS BETWEEN PERSONS BASED ON TRANSACTIONS

(75) Inventors: Dhanurjay A. S. Patil, Belmont, CA (US); Grahame Andrew Jastrebski, San Jose, CA (US); Chris Riccomini, Saratoga, CA (US)

(73) Assignee: eBay Inc., San Jose, CA (US)

( * ) Notice: Subject to any disclaimer, the term of this patent is extended or adjusted under 35 U.S.C. 154(b) by 1254 days.

(21) Appl. No.: 11/961,817

(22) Filed: Dec. 20, 2007

(65) Prior Publication Data

US 2009/0122065 A1    May 14, 2009

Related U.S. Application Data

(60) Provisional application No. 60/986,879, filed on Nov. 9, 2007.

(51) Int. Cl.
*G06T 11/20* (2006.01)

(52) U.S. Cl.
USPC ....................................................... 345/440

(58) Field of Classification Search
CPC ............ G06T 11/206; G06F 17/30572; G06F 17/30716; G06F 17/30719; G06F 17/30126; G06F 17/30994; G06F 19/26; G06F 19/708
USPC ....................................................... 345/440
See application file for complete search history.

(56) References Cited

U.S. PATENT DOCUMENTS

| | | | |
|---|---|---|---|
| 5,136,690 A * | 8/1992 | Becker et al. ................. | 715/853 |
| 5,185,696 A | 2/1993 | Yoshino et al. | |
| 5,390,113 A | 2/1995 | Sampson | |
| 5,596,703 A * | 1/1997 | Eick et al. ..................... | 345/440 |
| 5,778,178 A | 7/1998 | Arunachalum | |
| 5,819,226 A | 10/1998 | Gopinathan et al. | |
| 5,870,559 A * | 2/1999 | Leshem et al. ................ | 709/224 |
| 5,950,179 A | 9/1999 | Buchanan et al. | |
| 5,963,922 A | 10/1999 | Helmering | |
| 5,987,500 A | 11/1999 | Arunachalam | |

(Continued)

FOREIGN PATENT DOCUMENTS

JP         55110367 A         8/1980

OTHER PUBLICATIONS

Tomasz Imielinski, Aashu Virmani; MSQL: A Query Language for Database Mining; 1999; Data Mining and Knowledge Discovery, 1999 Kluwer Academic Publishers, Manufactured in The Netherlands; vol. 3, No. 4, pp. 373-408.*

(Continued)

*Primary Examiner* — Jeffery A Brier
(74) *Attorney, Agent, or Firm* — Schwegman Lundberg & Woessner, P.A.

(57) ABSTRACT

In one example embodiment, a system and method is shown as including identifying a context set data defining a context within which a person resides. Next, an operation is executed so as to retrieve the context set data that includes person data and relationship between persons data, the relationship between persons data including certain characteristics that define the person in the context set. An operation may be executed so as to perform a set operation on the person in the context set so as to generate a graph set. Further, an operation may be executed to render a graphical representation of the context set.

19 Claims, 16 Drawing Sheets

(56) References Cited

U.S. PATENT DOCUMENTS

| | | | |
|---|---|---|---|
| 6,094,643 | A | 7/2000 | Anderson et al. |
| 6,212,556 | B1 | 4/2001 | Arunachalam |
| 7,464,056 | B1 | 12/2008 | Campbell et al. |
| 7,587,453 | B2 | 9/2009 | Bhrara et al. |
| 7,813,822 | B1 | 10/2010 | Hoffberg |
| 8,103,566 | B1 | 1/2012 | Petruzzi |
| 2001/0010730 | A1 | 8/2001 | Rhoads |
| 2001/0037315 | A1 | 11/2001 | Saliba et al. |
| 2001/0037316 | A1 | 11/2001 | Shiloh |
| 2002/0026348 | A1 | 2/2002 | Fowler et al. |
| 2002/0046049 | A1 | 4/2002 | Siegel et al. |
| 2002/0072993 | A1 | 6/2002 | Sandus et al. |
| 2002/0103660 | A1 | 8/2002 | Cramon et al. |
| 2002/0123957 | A1 | 9/2002 | Notarius et al. |
| 2003/0009411 | A1 | 1/2003 | Ram et al. |
| 2003/0018558 | A1 | 1/2003 | Heffner et al. |
| 2003/0026404 | A1 | 2/2003 | Joyce et al. |
| 2003/0036989 | A1 | 2/2003 | Bhatia |
| 2003/0061132 | A1 | 3/2003 | Yu, Sr. et al. |
| 2003/0172013 | A1 | 9/2003 | Block et al. |
| 2003/0216984 | A1 | 11/2003 | Wang |
| 2004/0034573 | A1 | 2/2004 | Cohen |
| 2004/0034616 | A1 | 2/2004 | Witkowski et al. |
| 2004/0164983 | A1* | 8/2004 | Khozai ............... 345/440 |
| 2004/0236688 | A1 | 11/2004 | Bozeman |
| 2005/0144111 | A1 | 6/2005 | Manstein et al. |
| 2005/0187827 | A1 | 8/2005 | Weiss et al. |
| 2005/0187881 | A1 | 8/2005 | McGiffin et al. |
| 2005/0222929 | A1 | 10/2005 | Steier et al. |
| 2005/0256735 | A1 | 11/2005 | Bayne |
| 2005/0283494 | A1 | 12/2005 | Colossi et al. |
| 2006/0028471 | A1 | 2/2006 | Kincaid et al. |
| 2006/0069635 | A1 | 3/2006 | Ram et al. |
| 2006/0149674 | A1 | 7/2006 | Cook et al. |
| 2006/0173772 | A1 | 8/2006 | Hayes et al. |
| 2006/0229921 | A1 | 10/2006 | Colbeck |
| 2007/0033105 | A1 | 2/2007 | Collins et al. |
| 2007/0100875 | A1 | 5/2007 | Chi et al. |
| 2007/0282673 | A1 | 12/2007 | Nagpal et al. |
| 2008/0011844 | A1 | 1/2008 | Tami et al. |
| 2008/0015938 | A1 | 1/2008 | Haddad et al. |
| 2008/0135612 | A1 | 6/2008 | Silbernagl et al. |
| 2008/0140682 | A1 | 6/2008 | Grosset et al. |
| 2009/0125543 | A1 | 5/2009 | Patil et al. |

OTHER PUBLICATIONS

Bernd Amann and Michel Scholl; Gram: A Graph Data Model and Query Language; 1992; Proceeding ECHT '92 Proceedings of the ACM conference on Hypertext; pp. 201-211.*

Mark Graves, Ellen R. Bergeman, Charles B. Lawrence; Graph Database Systems; Dec. 1995; Engineering in Medicine and Biology Magazine, IEEE; vol. 14, Issue 6, pp. 737-745.*

Ivan Herman and M. Scott Marshall; GraphXML—An XML-Based Graph Description Format; 2001; Lecture Notes in Computer Science, 2001,vol. 1984, pp. 52-62.*

"U.S. Appl. No. 09/793,843, Examiner Interview Summary mailed Mar. 17, 2005", 3 pgs.

"U.S. Appl. No. 09/793,843, Final Office Action mailed Feb. 9, 2007", 5 pgs.

"U.S. Appl. No. 09/793,843, Non Final Office Action mailed Jun. 13, 2006", 18 pgs.

"U.S. Appl. No. 09/793,843, Non Final Office Action mailed Dec. 9, 2005", 16 pgs.

"U.S. Appl. No. 09/793,843, Notice of Allowance mailed Apr. 13, 2007", 8 pgs.

"U.S. Appl. No. 09/793,843, Preliminary Amendment filed Aug. 19, 2004", 11 pgs.

"U.S. Appl. No. 09/793,843, Response filed Feb. 20, 2007 to Final Office Action mailed Feb. 9, 2007", 17 pgs.

"U.S. Appl. No. 09/793,843, Response filed Feb. 22, 2006 to Non Final Office Action mailed Dec. 9, 2005", 17 pgs.

"U.S. Appl. No. 09/793,843, Response filed Apr. 5, 2005 to Restriction Requirement mailed Mar. 17, 2005", 13 pgs.

"U.S. Appl. No. 09/793,843, Response filed Aug. 3, 2006 to Non Final Office Action mailed Jun. 13, 2006", 20 pgs.

"U.S. Appl. No. 09/793,843, Restriction Requirement mailed Mar. 17, 2005", 8 pgs.

"U.S. Appl. No. 12/005,005, Final Office Action mailed Sep. 28, 2010", 24 pgs.

"U.S. Appl. No. 12/005,005, Non-Final Office Action mailed Apr. 15, 2010", 19.

"U.S. Appl. No. 12/005,005, Response filed Jul. 15, 2010 to Non Final Office Action mailed Apr. 15, 2010", 9 pgs.

"U.S. Appl. No. 12/005,005, Response filed Dec. 22, 2010 to Final Office Action mailed Sep. 28, 2010", 10 pgs.

"U.S. Appl. No. 12/005,005, Non Final Office Action mailed Apr. 12, 2012", 26 pgs.

"U.S. Appl. No. 12/005,005, Response filed Jun. 27, 2011 to Non-Final Office Action Received Apr. 12, 2011", 10 pgs.

"U.S. Appl. No. 12/005,005 , Response filed Jul. 25, 2013 to Final Office Action mailed Apr. 25, 2013", 14 pgs.

"U.S. Appl. No. 12/005,005 , Response filed Dec. 31, 2012 to Non Final Office Action mailed Aug. 30, 2012", 12 pgs.

"U.S. Appl. No. 12/005,005, Final Office Action mailed Apr. 25, 2013", 19 pgs.

"U.S. Appl. No. 12/005,005, Final Office Action mailed Oct. 14, 2011", 14 pgs.

"U.S. Appl. No. 12/005,005, Non Final Office Action mailed Aug. 30, 2012", 15 pgs.

"U.S. Appl. No. 12/005,005, Response filed Jan. 16, 2012 to Final Office Action mailed Oct. 14, 2011", 10 pgs.

Chakrabarti, Deepayan, et al., "Fully Automatic Cross-associations", In Proceedings of the Tenth ACM SIGKDD International Conference on Knowledge Discovery and Data Mining, (2004), 1-12.

"U.S. Appl. No. 12/005,005, Advisory Action mailed Aug. 23, 2013", 3 pgs.

"U.S. Appl. No. 12/005,005, Examiner Interview Summary mailed Aug. 23, 2013"; 2 pgs.

"U.S. Appl. No. 12/005,005, Non Final Office Action mailed Sep. 30, 2013", 20 pgs.

"U.S. Appl. No. 12/005,005, Response filed Aug. 26, 2013 to Final Office Action mailed Apr. 25, 2013", 15 pgs.

"U.S. Appl. No. 12/005,005, Notice of Allowance mailed Feb. 28, 2014", 7 pgs.

"U.S. Appl. No. 12/005,005, Response filed Dec. 30, 2013 to Non Final Office Action mailed Sep. 30, 2013", 13 pgs.

* cited by examiner

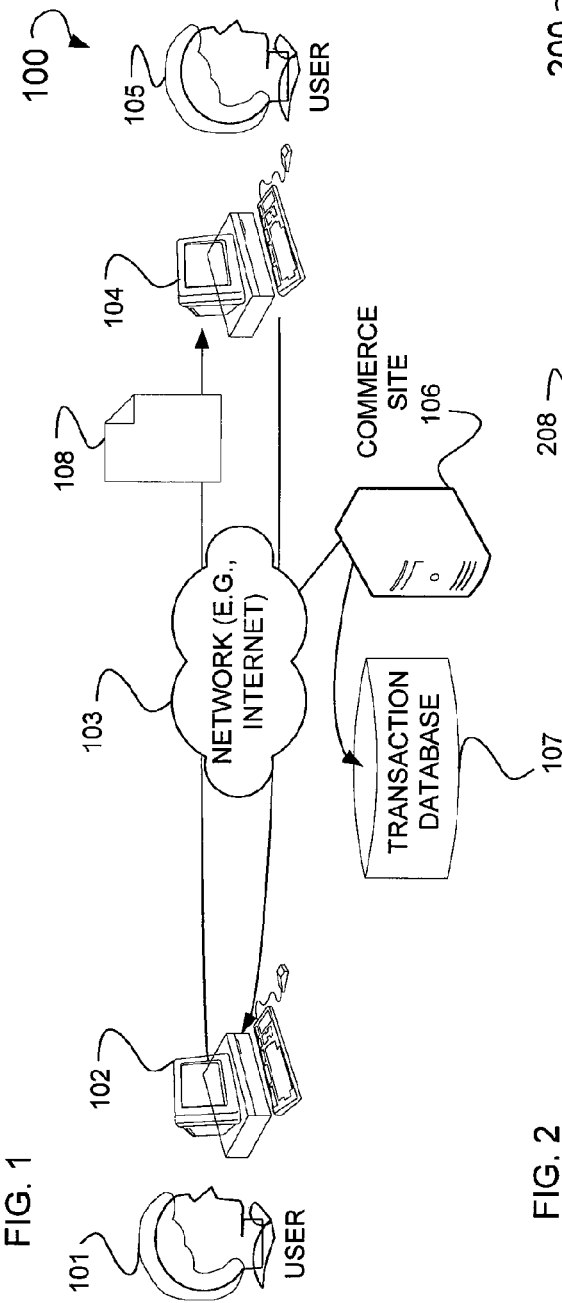
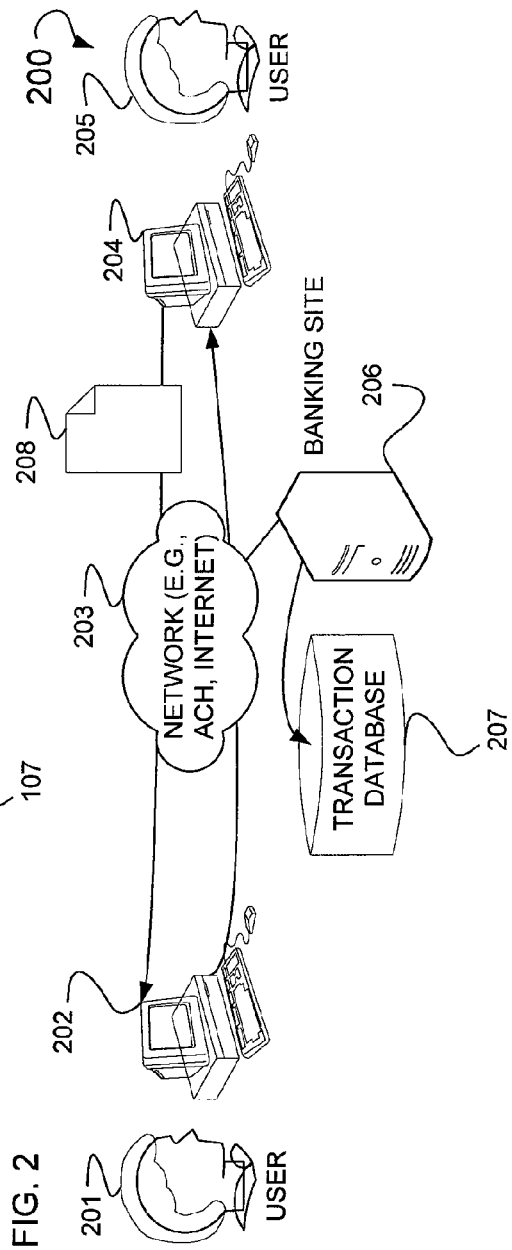

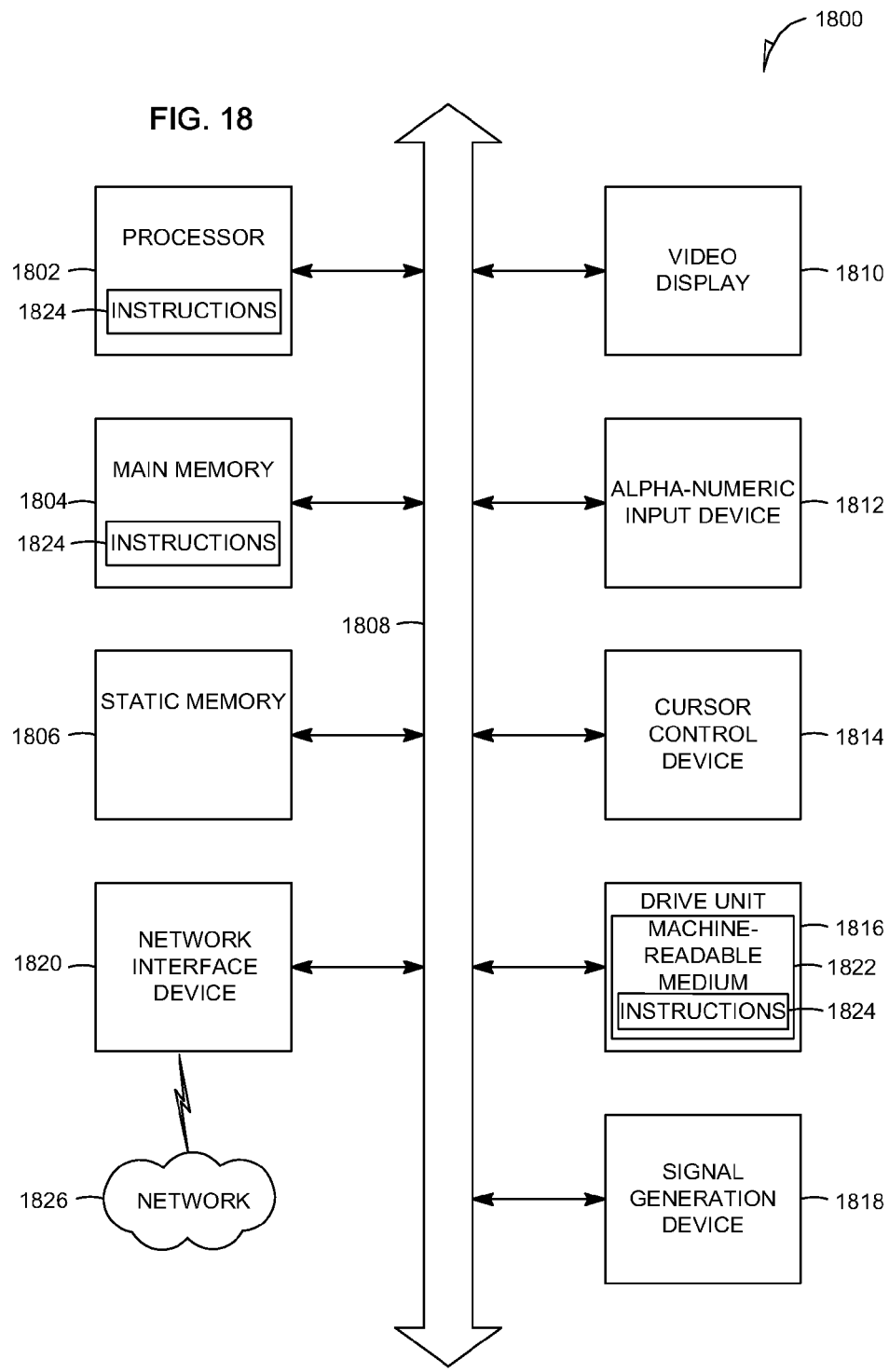

METHODS AND SYSTEMS TO GENERATE GRAPHICAL REPRESENTATIONS OF RELATIONSHIPS BETWEEN PERSONS BASED ON TRANSACTIONS

CROSS REFERENCE TO RELATED APPLICATIONS

This is a United States Patent Application that claims priority under 35 U.S.C. §119(e) to U.S. Provisional Patent Application titled: "NETWORK RATING VISUALIZATION," (Ser. No. 60/986,879) filed on Nov. 9, 2007 which is incorporated by reference in its entirety herein.

TECHNICAL FIELD

The present application relates generally to the technical field of graphical interfaces, algorithms and programming and, in one specific example, the retrieving of transaction data for graphic display.

BACKGROUND

Graphs may be composed of edges and nodes that represent persons and their relationships to other persons. These graphs may only be limited in their size by the complexity of the relationships between specific persons. That is, if a person has, for example, a plurality of complex relationships, then the graph representing this person and their relationship to other persons might be quite large.

BRIEF DESCRIPTION OF THE DRAWINGS

Some embodiments are illustrated by way of example and not limitation in the figures of the accompanying drawings in which:

FIG. 1 is a diagram of a system, according to an example embodiment, that records transaction data between two users.

FIG. 2 is a diagram of a system, according to an example embodiment, showing banking data being exchanged by two users.

FIG. 18 shows a diagrammatic representation of a machine in the example form of a computer system, according to an example embodiment.

DETAILED DESCRIPTION

Figure 3:
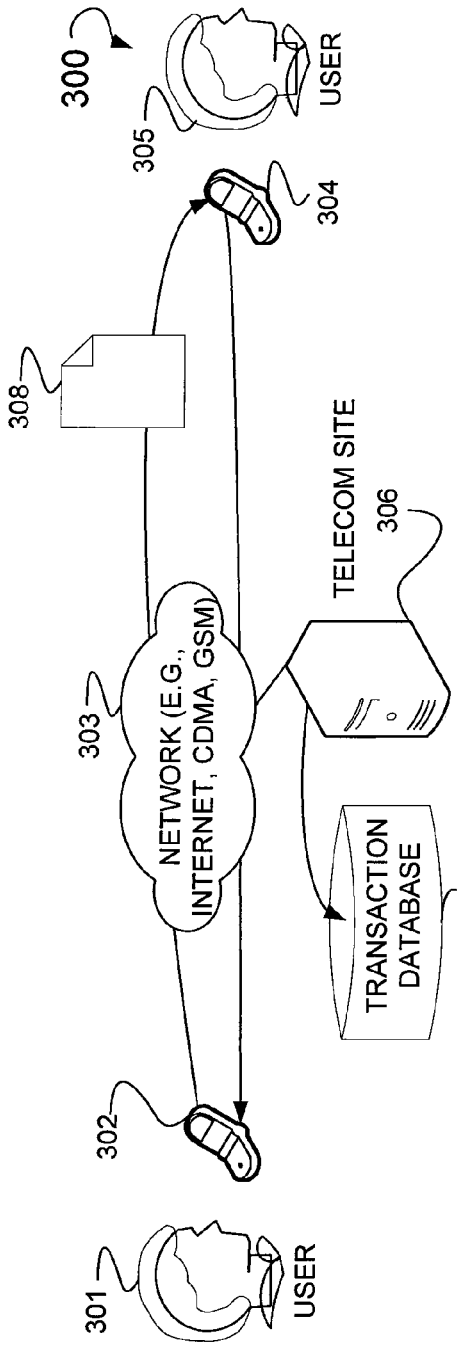
FIG. 3 is diagram of a system, according to an example embodiment, showing an exchange of telecom data between users.

Embodiments of methods and systems to view a graphical representation of relationships between persons (e.g., legal or natural persons) based upon transactions between persons are illustrated. In the following description, for purposes of explanation, numerous specific details are set forth to provide a thorough understanding of some embodiments. It may be evident, however, to one skilled in the art that some embodiments may be practiced without these specific details.

In some example embodiments, a system and a method are illustrated that allows users to understand relationships between account holders in real time. Account holders or accounts may be represented as nodes in a graph. The relationships between these accounts may be represented as edges connecting these accounts. These edges may be directed edges, or non-directed edges. In some example cases, directed edges may represent transactions between account holders. Further, in some example cases, these edges may be colored, highlighted, or otherwise distinguished to the user to inform the user as to what type of relationship between nodes they represent. An image of a graph is shown in real time based using a stream of real-time account data (e.g., an account data stream), and transactions related to these accounts. In this embodiment, the image of the graph may be considered as dynamic such that it may change based upon the changing nature of the account data stream.

In one example embodiment, a system and a method are illustrated that allows transactions between persons to be represented visually as a graph containing nodes and edges. Some example embodiments may include an interface that allows a user to request data from a database by querying the database based upon a person's uniquely identifying information. This uniquely identifying information may be person data in the form of the person's individual Internet Protocol (IP) address, the person's unique account identifier value (e.g., an on-line account number, or bank account number) the person's social security number, the person's date of birth, the person's physical address value, or some other uniquely identifying information. Further, relationship data (e.g., the above referenced edges) may be used to identify the specific contexts within which the person may participate, and further to uniquely identifying these specific context. Example relationship data includes data identifying: a particular geographical location shared with other identified persons, an account (e.g., bank account, telecom account, on-line account, e-commerce account, stock trading account, credit card account, or some other suitable account) shared with other identified persons, or a financial institution used to transact business also used by other identified persons. Moreover, relationship data may include transactions occurring during a certain time of day, a time of day during which others identified persons also transact business. Identified persons are those persons for which person data exists. Collectively, this person data and relationship data may be considered as uniquely identifying information, and may define a specific context (e.g., geographical location, a particular financial institution, or time information) that a person may participate within which may be referred to as a context set. The data contained within this context set may be a context set (e.g., context set data) in the form of this uniquely identifying information.

In some example embodiments, the data used to generate a context set may be received from any one of a number of sources. These sources may include various web sites that transact business on the Internet such as commerce sites, banking sites, or Internet Service Provider (ISP) sites. Further, sources may include telephone Communications (Telecom) companies. Further, these sources may include certain pay sources such as EXPERIAN™, EQUIFAX™, TRANSUNION™, LEXIS-NEXIS™, or some other suitable service that provides data to generate context set. Some example embodiments may include retrieving data from these sources based upon transactions that occur between persons using this website, or other suitable bases for supplying the context set. For example, the sale of goods or services over the Internet as facilitated by a commerce site may be tracked, the data relating to this transaction stored, and a relationship between two or more persons established and represented as a graph. Additionally, a transfer of money for a debt owing between two persons may be tracked by a banking site, and a relationship established between the persons and represented as a graph. A further example may be the case where persons email each other, or make telephone calls to each other. In these example cases, the person may be shown graphically to have a relationship.

Some example embodiments may include the use of an edge in a graph to reflect the nature of the relationship been two persons represented as nodes in the graph. For example, a directed edge in the graph may represent the flow of money during a transaction. Additionally, a particular color of an edge in a graph may represent one type of relationship between the nodes, whereas another color may represent another type of relationship.

In some example embodiments, once a context set is defined, various set operations may be performed using members of the context set, or using members of a plurality of context sets. These set operations may include, for example, a union ("U") operation, an intersection ("∩") operation, a Cartesian product ("x"), a set difference ("−") operation, or some other suitable operation that allows for relationships between the members of the sets to be established and illustrated via edges. The result of various set operations may be, for example, a graph set.

In some example embodiments, the graph set may be encoded and represented in some type of descriptive language such as an XML file, a comma delimited flat file, or other suitable file. Once represented, a graphics engine may be executed to process and render the graph set data contained in the file.

In some example embodiments, the graph set may be rendered into a visual format such that nodes are displayed as are edges between nodes. The nodes, in some embodiments, may be displayed visually with a high level of granularity such that additional details may be shown regarding a node. These additional details may include account information relating to a particular node. Further, in some example embodiments, information of increasing granularity may be displayed regarding the edges that connect the nodes.

Example System

FIG. 1 is a diagram of an example system 100 that records commerce transaction data between two users. Shown is a user 101 utilizing a computer system 102 to send transaction data 108 across a network 103 to a computer 104 utilized by, for example, a user 105. This transaction data may be, for example, data evidencing a sale of goods or services across the network 103. This transaction data 108 may be, in some example embodiments, recorded by a commerce site 106, where the commerce site 106 utilizes one or more servers such as, for example, web servers, application servers, or database servers. In some example embodiments, the commerce site 106 may record the transaction data 108 into a transaction database 107 for future use, or accessing.

FIG. 2 is a diagram of an example system 200 showing banking data being exchanged by two users. Illustrated is a user 201 utilizing a computer system 202 to send banking data across a network 203 that may be received by a computer system 204 utilized by a user 205. The user 201 may send this banking data 208 to, for example, provide money to the user 205. This money may be in the form of, for example, a wire transfer, or some other transfer of funds across a network 203. A banking site 206 may record this banking data 208. The banking site 206 may contain, for example, a web server, application server, database server, or some combination or plurality of these various servers. Some example embodiments may include the banking site 206 storing the banking data 208 into a transaction database 207.

FIG. 3 is diagram of an example system 300 showing an exchange of telecom data between users across a network. Illustrated is a user 301 utilizing some type of telecom device 302 to send telecom data 308 across the network 303 to another telecom device 304 that is utilized by, for example, a user 305. This telecom data 308 may be packet switched data or data sent along a dedicated circuit. Further, this network 303 may be, for example, a Plain Old Telephone System (POTS) based network, a Code Divisional Multiple Access (CDMA) type network, a Global System for Mobile (GSM) communications based network, or some other suitable network. In some example embodiments, telecom site 306 may record this telecom data 308. This telecom site 306 may include, for example, a web server, application server, database server or some combination or plurality of these various server types. This telecom data may be stored into a transaction database 307 by the telecom site 306. The telecom devices 302 may include, for example, a traditional telephone, a cell phone, a Personal Digital Assistant (PDA), or some other suitable device capable of utilizing the network 303.

Figure 4:
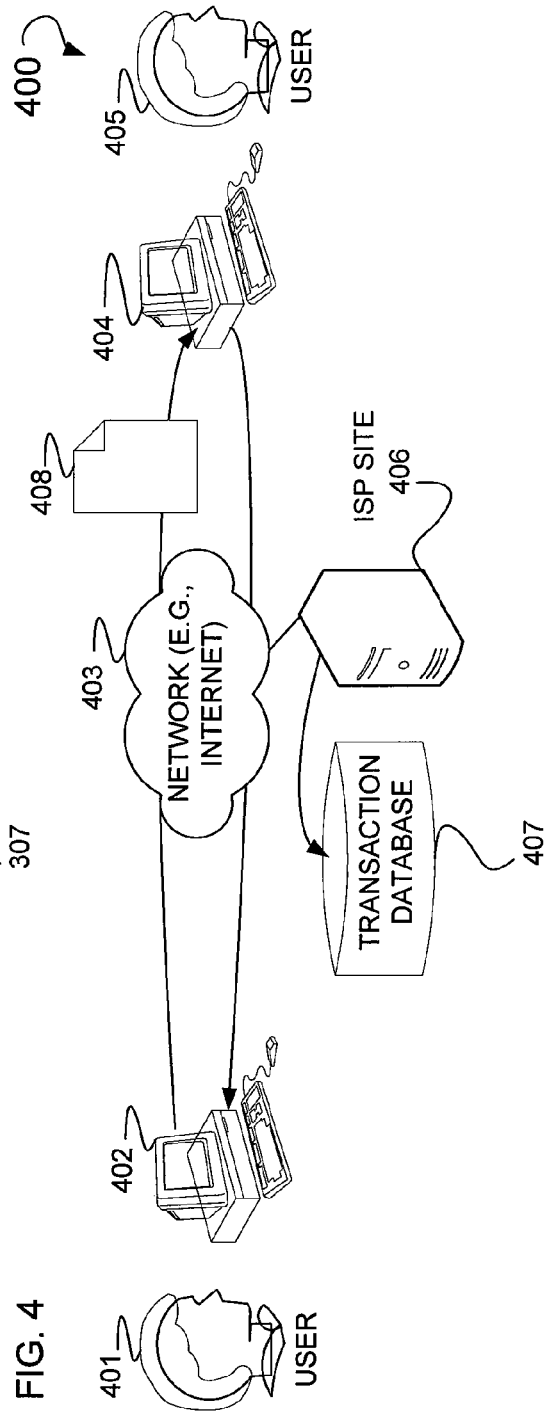
FIG. 4 is diagram of a system, according to an example embodiment, illustrating the exchange of Internet data between two users.

FIG. 4 is diagram of an example system 400 illustrating the exchange of Internet data between two users. Shown is a user 401 utilizing a computer system 402 to transmit Internet data 408 across to network 403 to a user 405 utilizing a computer system 404. In some example embodiments, the Internet data 408 may be some type of packetized data. This packetized data may utilize the Internet and, in doing so, utilize any one of a number of protocols as described in the Transmission Control Protocol/Internet Protocol (TCP/IP) stack model, or the Open Systems Interconnection (OSI) model. Protocols that may be utilized in the transmission or exchange of the Internet data 408 may include, for example, TCP, IP, User Datagram Protocol (UDP), the Hyper Text Transfer Protocol (HTTP), Frame Relay, or some other suitable protocol. In some example embodiments, an ISP site 406 may record the Internet data 408 sent across the network 403. This ISP site 406 may include, for example, a web server, application server, database server, or some combination or plurality of these various types of servers. This Internet data 408 may be stored by the ISP site 406 into a transaction database 407 for future access.

Figure 5:
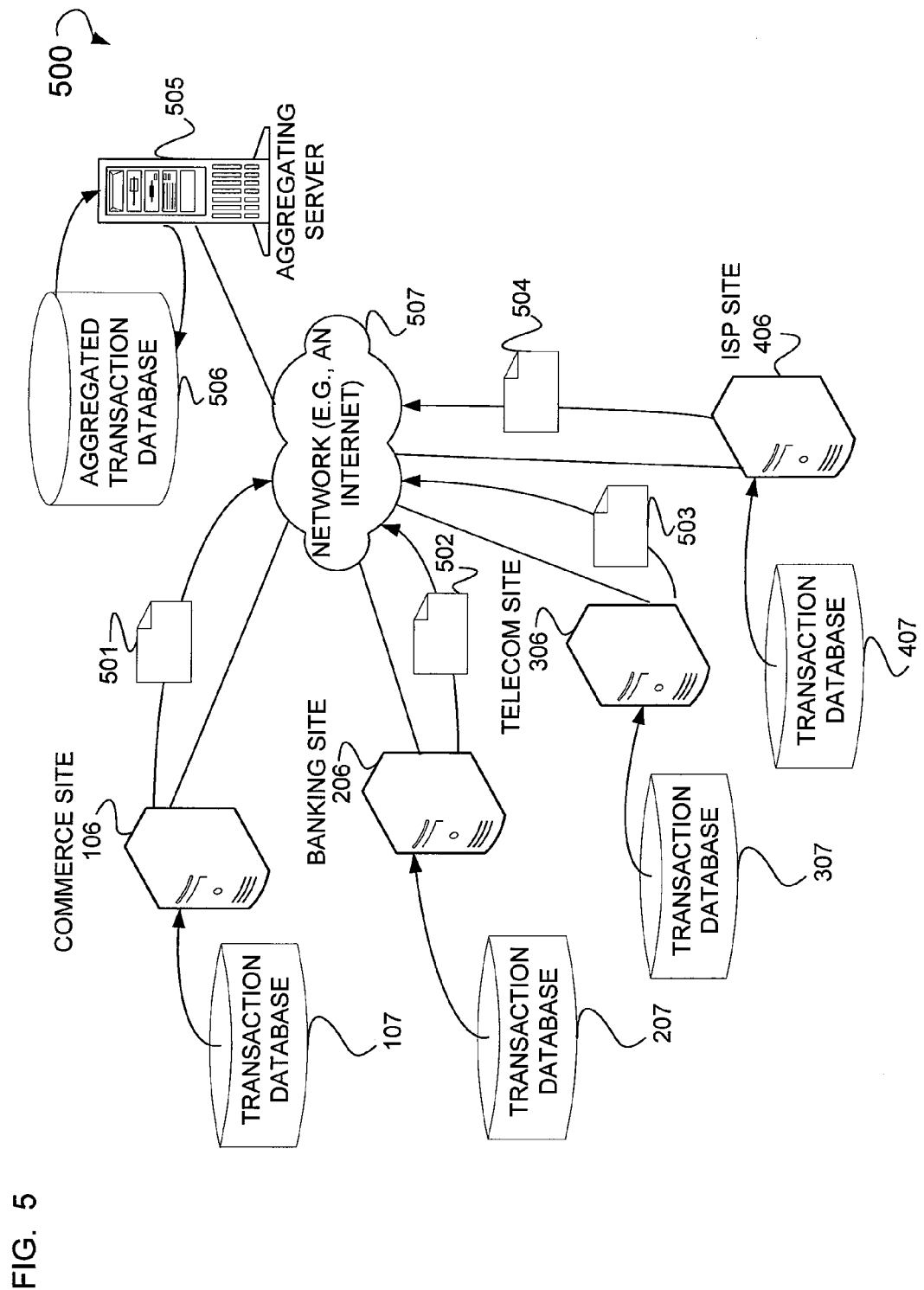
FIG. 5 is a diagram of a system, according to an example embodiment, illustrating the aggregation of various types of data stored on the previously referenced commerce site, banking site, telecom site, and Internet Service Provider (ISP) site.

FIG. 5 is a diagram of an example system 500 illustrating the aggregation of various types of data stored on the previously referenced commerce site 106, banking site 206, telecom site 306 and ISP site 406. Shown is an aggregating server 505 that is operably connected to an aggregated transaction database 506. This aggregating server 505 and an associated aggregated transaction database 506 may, in some example embodiments, receive data from the previously referenced commerce site 106, banking site 206, telecom site 306, and/or ISP site 406. This data may be received in the form of, for example, an aggregated commerce site data packet 501, an aggregated banking site data packet 502, an aggregated telecom site data packet 503, and/or an aggregated ISP site data packet 504. These various data packets (e.g., 501, 502, 503, or 504) may be transmitted across a network 507 to be received by the aggregating server 505. In some example embodiments, a number of these various data packets (e.g., 501, 502, 503, or 504) may be transmitted across the network 507. These various data packets 501-504 may be used to generate a context data set, for these data packets 501-504 may provide both person data and relationship data. This aggregating server 505 may store these various data packets into the aggregated transaction database 506. In some example embodiments, the aggregating server 505 may generate some type of database query utilizing, for example, HTTP, or some other suitable protocol where this protocol may be utilized to, for example, query one of the previously referenced sites (e.g., 106, 206, 306, or 406). Once this query is tendered to one or more of these previously referenced sites, one or more of these previously referenced sites may access an associated transaction database. For example, once the commerce site 106 receives a query from the aggregating server 505, it may query its associated transaction database 107 to retrieve the previously referenced commerce site data packet 501. Similarly, the telecom site 306, upon receiving a query from the aggregating server 505, may query its associate transaction database 307 to retrieve data to generate the telecom site data packet 503 and to send this on to the aggregating server 505 across the network 507. In some example embodiments, the aggregating server 505 may utilize a Structured Query Language (SQL), or some other suitable database query language (e.g., Multi-Dimensional Expression (MDX) Language) to query one or more of the previously referenced sites (e.g., 106, 206, 306 or 406).

In some example embodiments, rather than the aggregating server 505 storing these various data packets into the aggregated transaction database 506, the aggregating server 505 receives, processes, and generates a rendered graph set in real time. In one example embodiment, a TCP/IP connection is established between the aggregating server 505 and the previously referenced sites 106, 206, 306, and 406. In some example embodiments, a TCP/IP connection may be established with a pay source. In certain cases, UDP/IP may be utilized to establish a connection with the previously referenced sites 106, 206, 306, and 406, and/or a pay source. Once a connection is established, protocols such as HTTP, or even a Real Time Streaming Protocol (RTSP) may be used to generate an account data stream.

Figure 6:
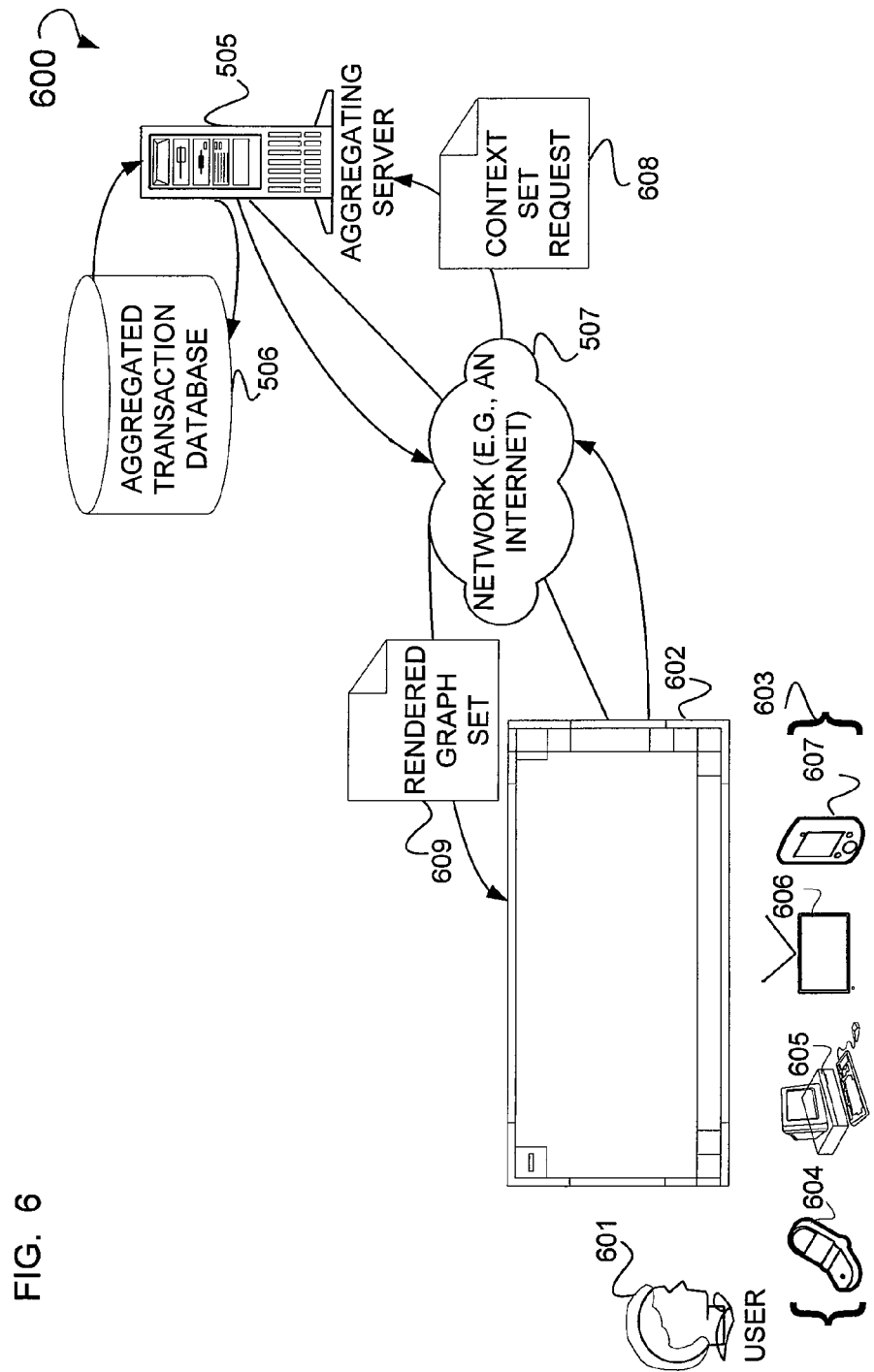
FIG. 6 is a diagram of a system, according to an example embodiment, illustrating the retrieval of aggregated transaction data for the purposes of rendering this data in the form of a graph.

FIG. 6 is a diagram of an example system 600 illustrating the retrieval of aggregated transaction data for the purposes of rendering this data in the form of a graph. Shown is a user 601 who, utilizing any one of a number devices 603, may retrieve and render aggregated transaction data. These various devices 603 include, for example, a cell phone 604, a computer system 605, a television 606 and/or a PDA 607. Residing on any one of a number of these devices 603 may be a GUI 602 that may be utilized by the user 601 to request and display aggregated transaction data. In one example embodiment, a context set request 608 is generated by the user 601 utilizing the GUI 602. This context set request 608 may be sent across a network 507 to the aggregating server 505. In some example embodiments, this context set request 608 may be formatted using, for example, the TCP/IP protocols that may be sent as part of an HTTP based request to the aggregating server 505. In some example embodiments, this HTTP based request may be sent in real time or near real time. Once this context set request 608 is received by the aggregating server 505, the aggregating server 505 may send an SQL query request to the aggregated transaction database 506 to retrieve aggregated transaction data to be displayed graphically in the GUI 602. In some example embodiments SQL may be used, whereas in other example embodiments MDX may be used as the query language for the aggregated transaction database 506. Once retrieved, the aggregating server 505 transmits a rendered graph set 609 across the network 507 to be displayed in the GUI 602. This rendered graph set may, for example, be transmitted in real time or near real time. In some example embodiments, the rendered graph set 609 may be generated by the one or more devices 603 based upon data retrieved from the aggregated transaction database 506. In some example embodiments, the rendered graph set 609 may be generated by the aggregating server 505.

Some example embodiments may include the generation of a rendered graph set 609 in real time. For example, a TCP/IP or UDP/IP connection may be established between the one or more devices 603 and the aggregating server 505. This connection may be in addition to existing TCP/IP or UDP/IP connections between the aggregating server 505 and the previously referenced sites 106, 206, 306, 406, and/or a pay source. Once established, the user 601 may be able to view graphs in real time based upon the real-time streaming of data from the previously referenced sites 106, 206, 306, 406, and/or a pay source. This data may be the account data stream.

Example Interfaces

Figure 7:
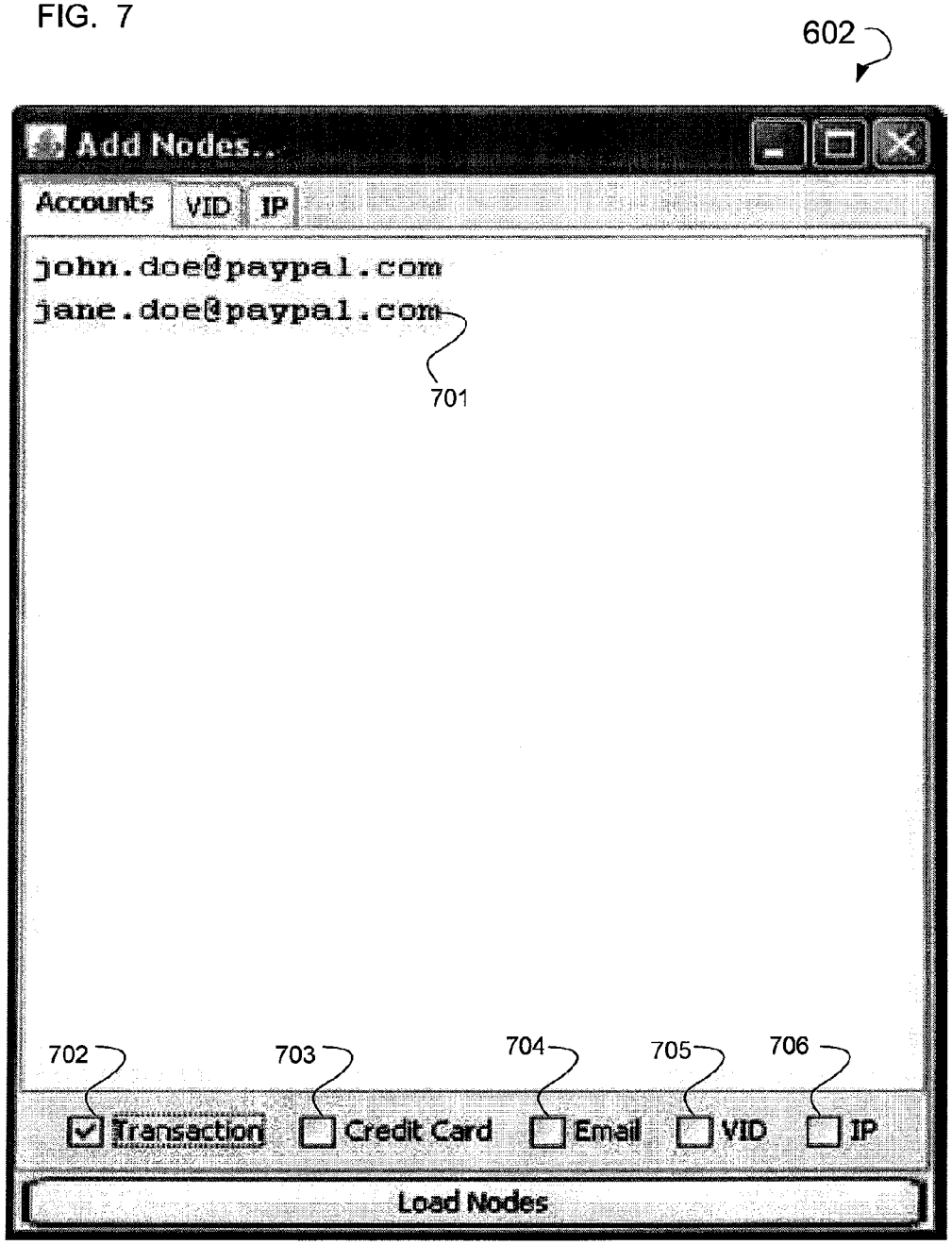
FIG. 7 is a diagram of a Graphical User Interface (GUI), according to an example embodiment, illustrating a set identifier GUI.

FIG. 7 is a diagram of an example GUI 602 illustrating, for example, a set identifier GUI. Shown is a set identifier GUI that is a part of the GUI 602. Utilizing this set identifier GUI 602, various frames are provided wherein a user, such as user 601, may be able to input data so as to identify a particular party or person (e.g., a natural person or a legal person such as a corporation) about which they would like to generate a graph. This graph may relate to, for example, various transactions that this person has engaged in with other persons. These other persons may also be, for example, natural persons or legal persons such a corporations. Shown is a person identifier 701 in the form of an email address for a particular person. This person identifier 701 may serve to identify a node in a graph. Here, for example, the person identified is Jane Doe. Additionally, with regard to this person identifier 701 and resulting node, there will be links associated with this person or node.

In some example embodiments, links or edges may be specified via a variety of checkboxes 702, 703, 704, 705 and 706. Checkbox 702 may associate various edges with the node identified via person identifier 701 in the form of transactions involving money between this node identified by person identifier 701 and other nodes. In some example embodiments, the edges identified through the execution of check box 702 may be directed edges. In other embodiments they may be non-directed or bi-directional edges. With regard to checkbox 703, when this checkbox is executed, edges denoting transactions involving credit cards may be denoted and shown graphically. As to checkbox 704, edges denoting transactions between parties in the form of emailed transactions may be shown as edges between nodes. With regard to checkbox 705, a cookie identifier checkbox may be executed that shows various Visitor IDs (VIDs) associated with an person. These VIDs may be stored into a browser cache as a cookie (e.g., a text file containing uniquely identifying information pertaining to a person) so as to uniquely identify a person. With regard to checkbox 706, this checkbox, when executed, may show various edges relating to an IP address utilized by an individual. This IP address may be utilized to send, for example, email traffic to another individual who may then be represented as a further node in a graph.

In some example embodiments, by selecting checkbox 702, transaction data 108 may be displayed as an edge in a graph. With regard to the selecting of checkbox 703 relating to credit card information, when this checkbox is selected, banking data 208 may be displayed as an edge in a graph. In cases where checkbox 704 is executed, Internet data 408 may be displayed as an edge in a graph. In cases where checkbox 705 is executed, telecom data 308 may be displayed as an edge in a graph. Again, in certain circumstances where a checkbox 706 is executed, Internet data 408 may be displayed as an edge in a graph.

Figure 8:
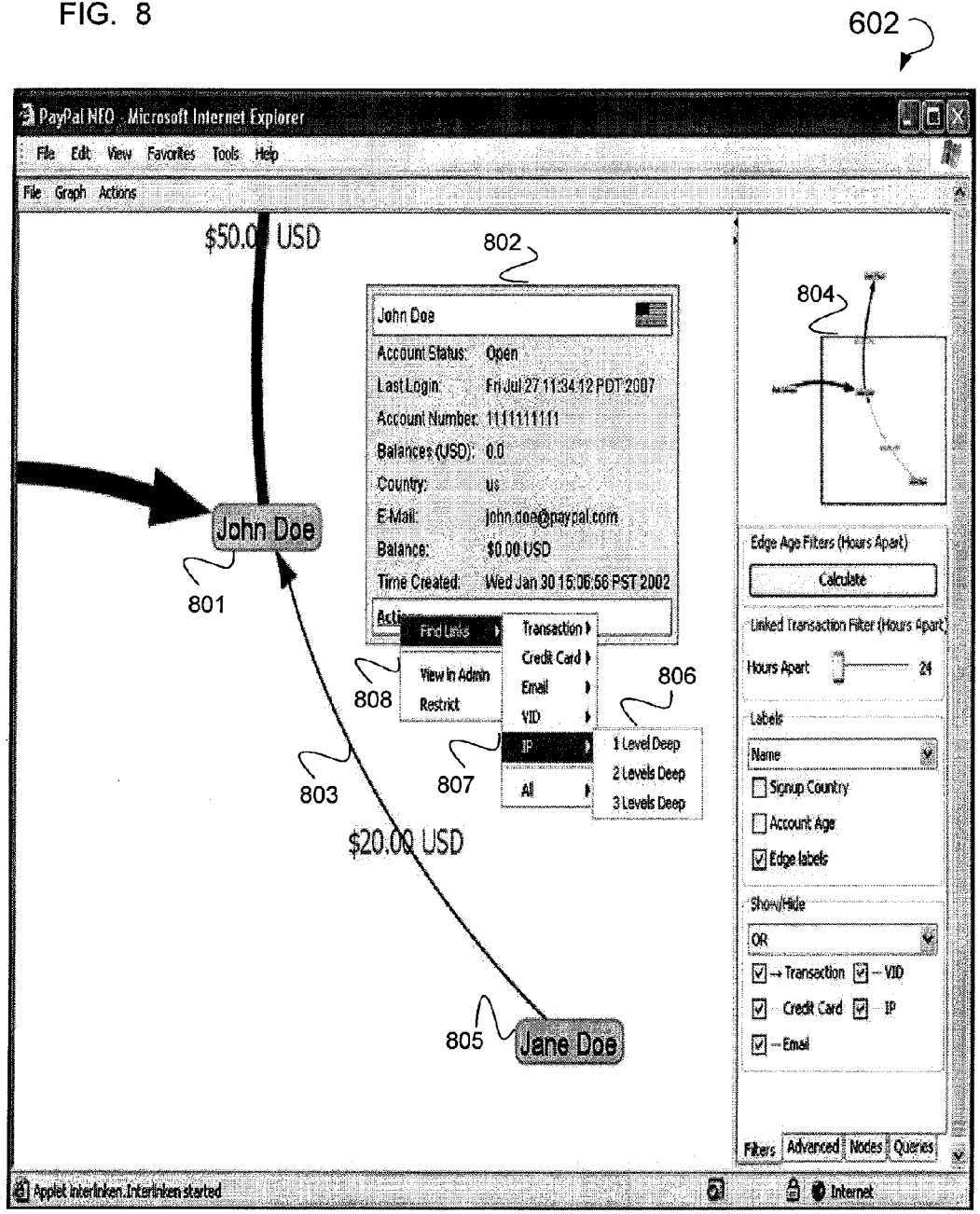
FIG. 8 is a diagram of a GUI, according to an example embodiment, displaying various nodes and edges in a graph and specific details regarding these nodes and edges.

FIG. 8 is a diagram of an example GUI 602 displaying various nodes and edges in a graph and specific details regarding these nodes and edges. Shown is a node 801 relating to the person known as John Doe. Additionally shown is an edge 803 in the form of a directed edge denoting a transaction between a node 805 representing Jane Doe and the previously reference node 801 representing John Doe. This directed edge 803 shows a transaction of money in the form of $20 being sent from the node 805 Jane Doe to the node 801 John Doe. Further, a popup box 802 is shown that illustrates specific information with regard to the node 801 John Doe. This information includes, for example, the name or reference for the node 801, an account status field, a last log-in field, an account number field, a balance field, a country field, an email field, a time created field, and other appropriate information. Also shown, is a frame 804 that provides detailed information as to a particular sub-path within the illustrated graph. This sub-path, for example, shows the path between the node 805 and the node 801. Also shown are various drop down menus including a drop down menu 808 to determine link types, a drop down menu 807 to determine a payment method or specific link type, and a menu 806 that allows a user 601 to determine the levels of analysis that they would like to examine. These level of analysis may include filtering various links between nodes so as to add or remove links between nodes. These links may be the aforementioned links displayed in menu 807.

Figure 9:
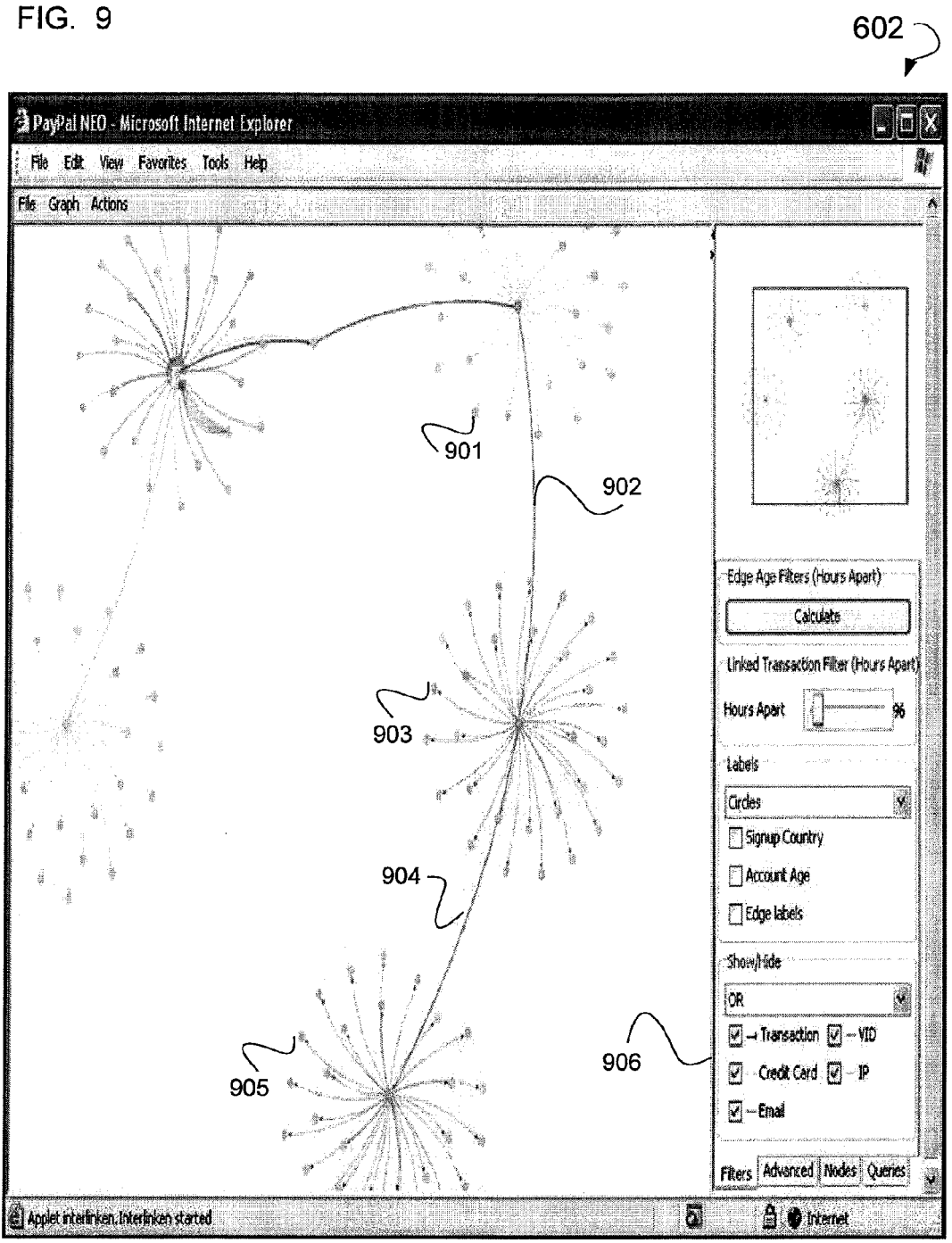
FIG. 9 is a diagram of a GUI, according to an example embodiment, showing clusters of the nodes and relationships, in the form of edges, between these clusters of nodes.

FIG. 9 is a diagram of an example GUI 602 showing clusters of the nodes and relationships in the form of edges between these clusters of nodes. Shown is a cluster 901 that is connected to a cluster 903 via an edge 902. Further, a cluster 905 is shown as being connected to the cluster 903 via an edge 904. In some example embodiments, the nodes that make up each one of these clusters 901, 903 and 905 may represent persons where these persons may be related to a central node such that the cluster has a star topology. In some example embodiments, some other suitable topology may be shown. The structure of this topology may be dictated by the transactions occurring between one particular person and a number of other persons identified as having engaged in transactions with this particular person. Some example embodiments may include the relationship to the central node in the form of one of the previously referenced types of transactions (e.g., transaction 108, banking data 208, telecom data 308, Internet data 408). In some example embodiments, a frame 906 is shown that allows a user, such as user 601, to select edges to be displayed that connect clusters of nodes (e.g., 901, 903 or 905) such that one or more edges may be shown to exist between one or more clusters where these edges may reflect the previously referenced transaction information (e.g., 108, 208, 308 or 408).

Figure 10:
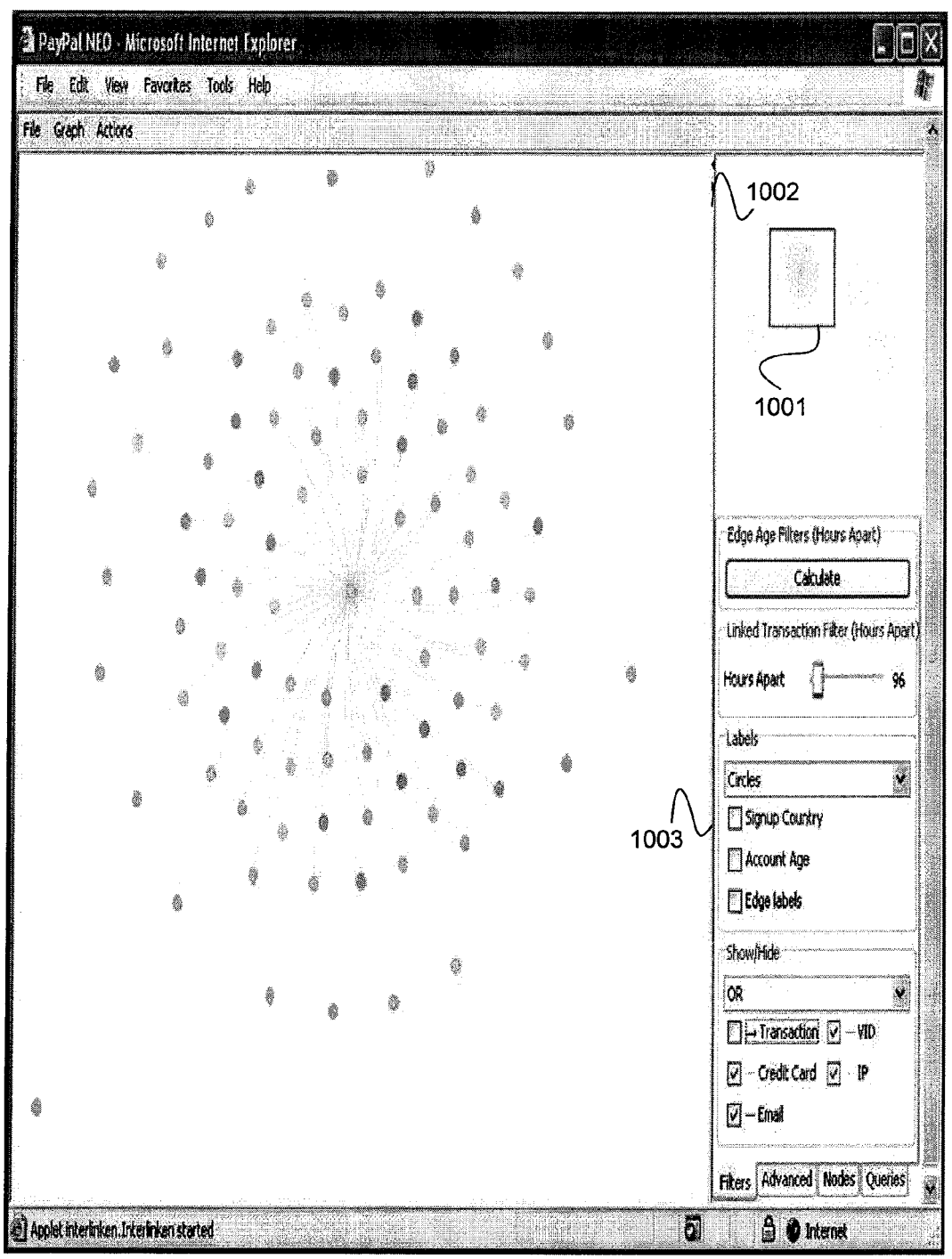
FIG. 10 is a diagram of a GUI, according to an example embodiment, showing an exploded view of a particular cluster.

FIG. 10 is a diagram of an example GUI 602 showing an exploded view of a particular cluster. Shown is a frame 1001 that depicts a particular cluster that is selected from a graph where this cluster is shown in an exploded view as represented in frame 1002. As previously referenced, the various nodes that make up this cluster may be, for example, persons in the form of natural persons or legal persons, and the edges between these various nodes may be determined through the selecting of various checkboxes as shown in FIG. 7, or as shown within a frame 1003. Displayed in this frame 1003, are various checkboxes denoting various transactions to be selected and then reflected as edges in the graph are displayed in this frame 1003.

Figure 11:
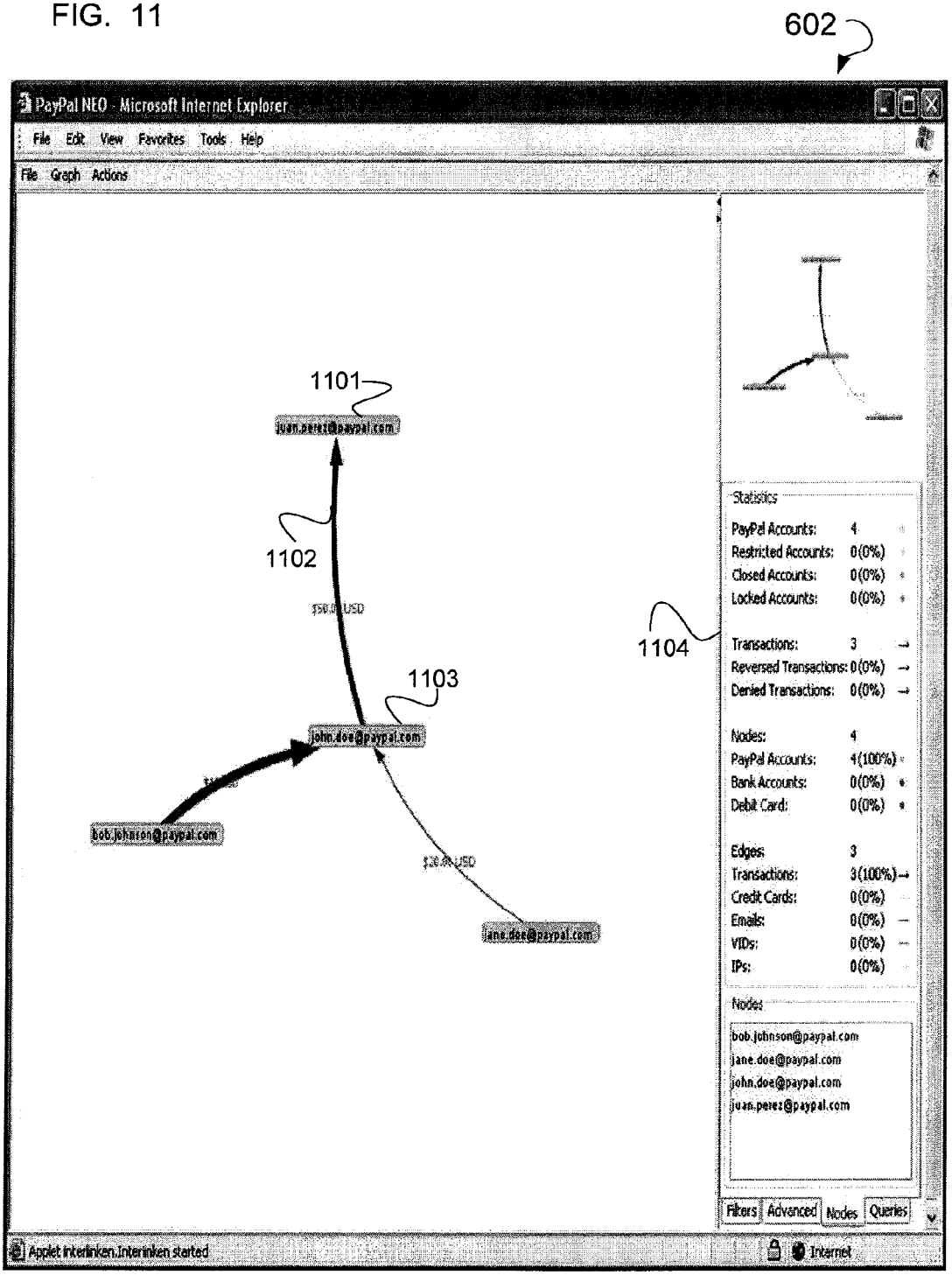
FIG. 11 is a diagram of a GUI, according to an example embodiment, showing a graph and specifically information relating to this graph.

FIG. 11 is a diagram of an example GUI 602 showing a graph and, specifically, information relating to this graph. Shown is a graph containing a node 1101 that is connected to another node 1103 via a directed edge 1102. The nodes 1101 and 1103 may represent persons, whereas the directed edge 1102 may represent a financial transaction between these persons. Here, for example, the sending of money from the node 1103 to the node 1101 is shown. In some example embodiments, the frame 1104 is displayed in the GUI 602 where this frame 1104 displays information with regard to the relationship between the nodes 1101 and 1103, and, more specifically, information displayed regarding the number of transactions between these nodes and edges themselves.

Figure 12:
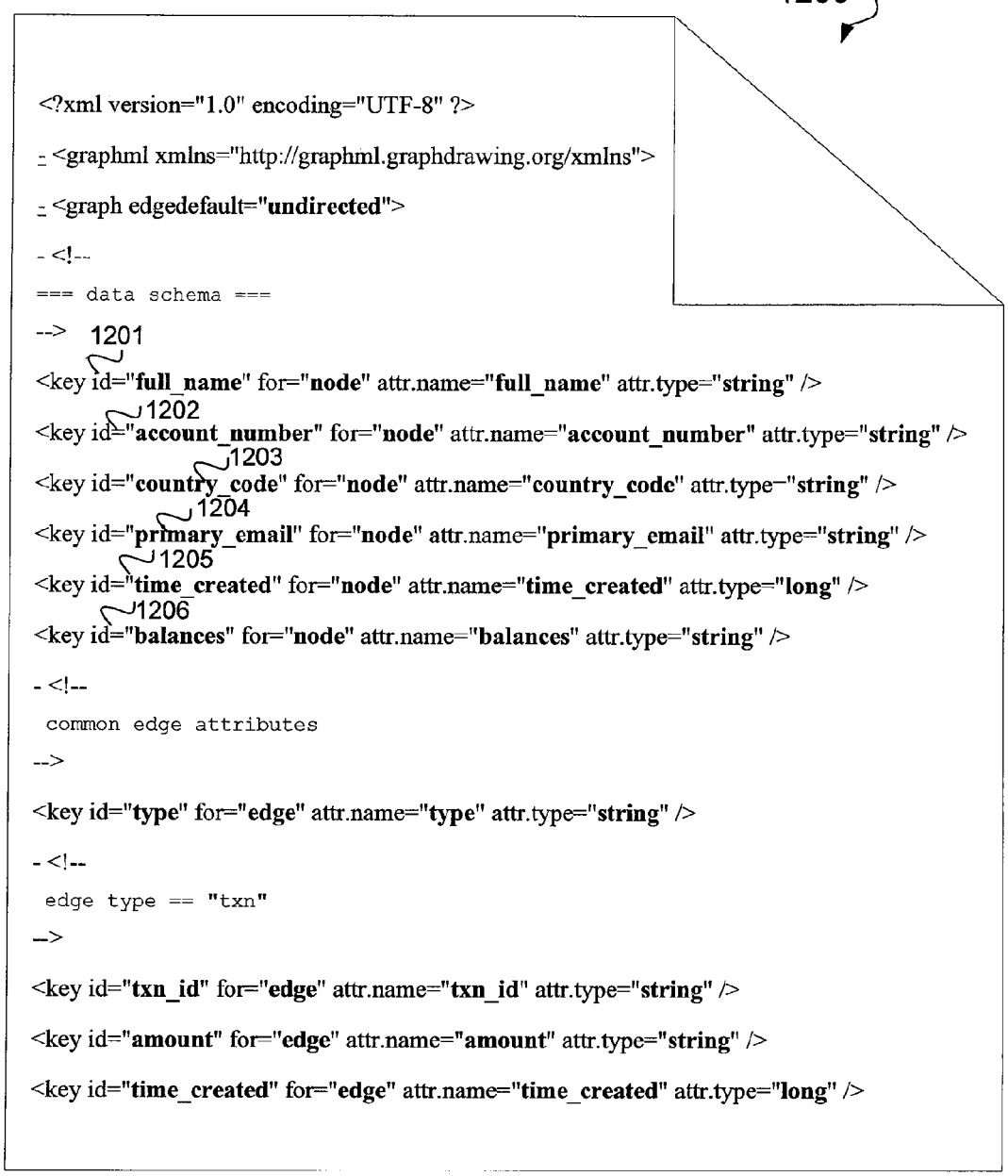
FIG. 12 is a diagram of an example extensible Markup Language (XML) schema, according to an example embodiment, used to format the aggregated transaction data retrieved from the aggregated transaction database by the aggregating server.

FIG. 12 is a diagram of an example XML schema 1200 used to format the aggregated transaction data retrieved from the aggregated transaction database 506 by the aggregating server 505. In some example cases, a Document Type Definition (DTD) or XML Schema Definition (XSD) may be implemented as the XML schema 1200. Shown is a XML schema 1200 containing a number of fields including, for example, a field 1201 denoting the full name of a particular person, a field 1202 denoting an account for a particular person, a field 1203 denoting a country code for a particular person, a field 1204 denoting a primary email for a particular person, a field 1205 denoting the time at which the account number contained in field 1202 was created and a field 1206 containing balances for this particular account to be displayed in the field 1202. This XML schema, in some example embodiments, may dictate the data to be used to describe a node and/or edges between nodes that will ultimately be displayed in the GUI 602 as a graph.

Figure 13:
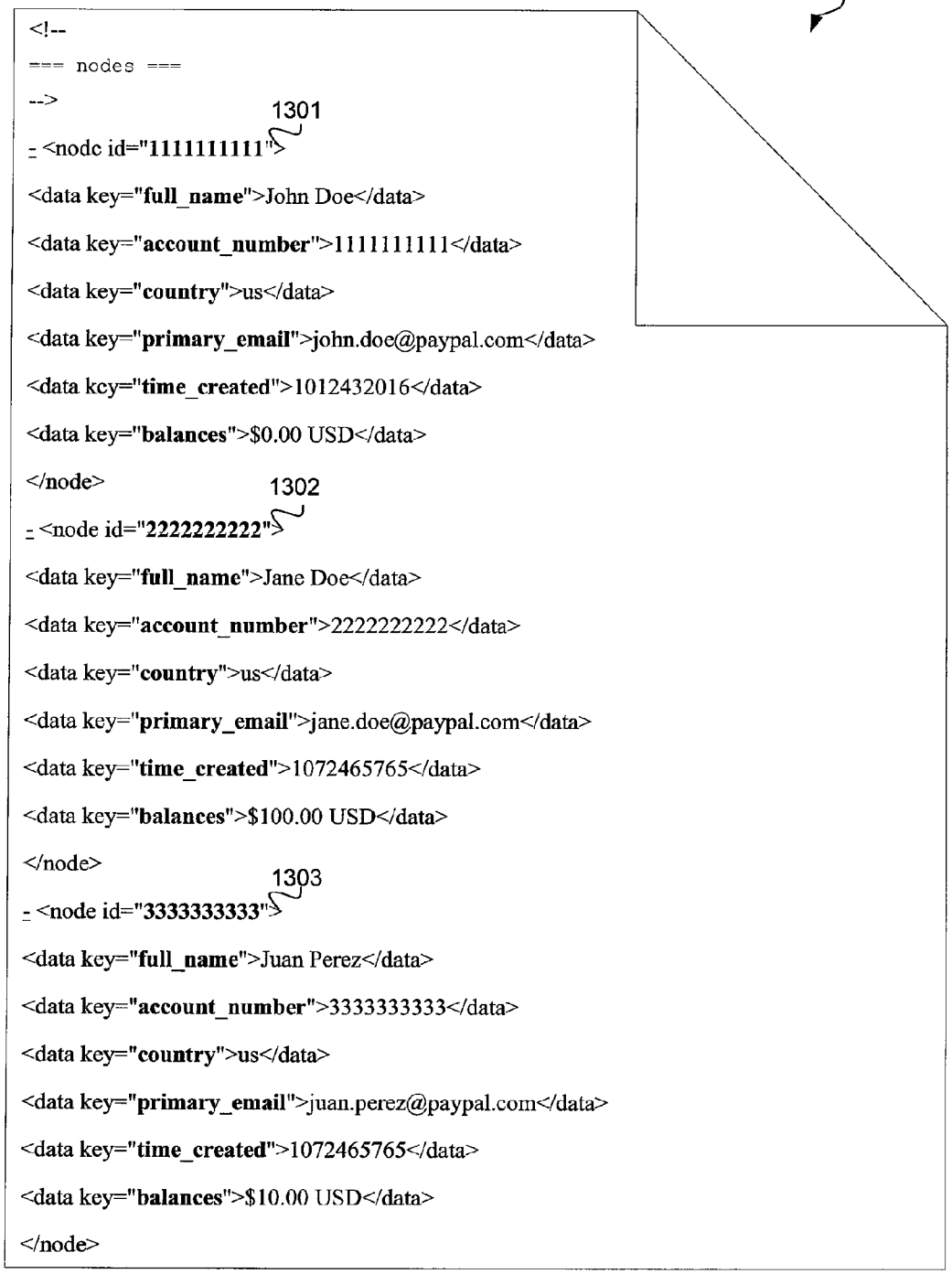
FIG. 13 is a diagram of an XML file, according to an example embodiment, containing data showing nodes.

FIG. 13 is a diagram of an example XML file 1300 containing data describing nodes. This XML file 1300 may be a graph set file that contains person data. Shown is a field 1301 referencing a node 1111111111, wherein this field 1301 displays various data keys, including data keys relating to the full name of a person, account number, country, primary email, time created and account balances (e.g., collectively referenced as person data). The format for these various data keys may, in some example embodiments, be dictated by the previously referenced XML schema 1200. Further, shown is a field 1302 referencing a node 2222222222, wherein again various data keys are displayed to provide data with regard to this node, wherein this data keys again relate to, for example, full name, account number, country, primary email, time created, and account balances. Also shown, in some example embodiments, is a field 1303 showing data relating to a node 3333333333, wherein again various data keys are shown for this node. These data keys illustrate, for example, the full name of a person, account number, country, primary email, time created and balances for this particular person, more specifically a node. As with the field 1301, the fields 1302 and 1303 and the various nodes that they refer to may be formatted based upon the XML schema 1200.

Figure 14:
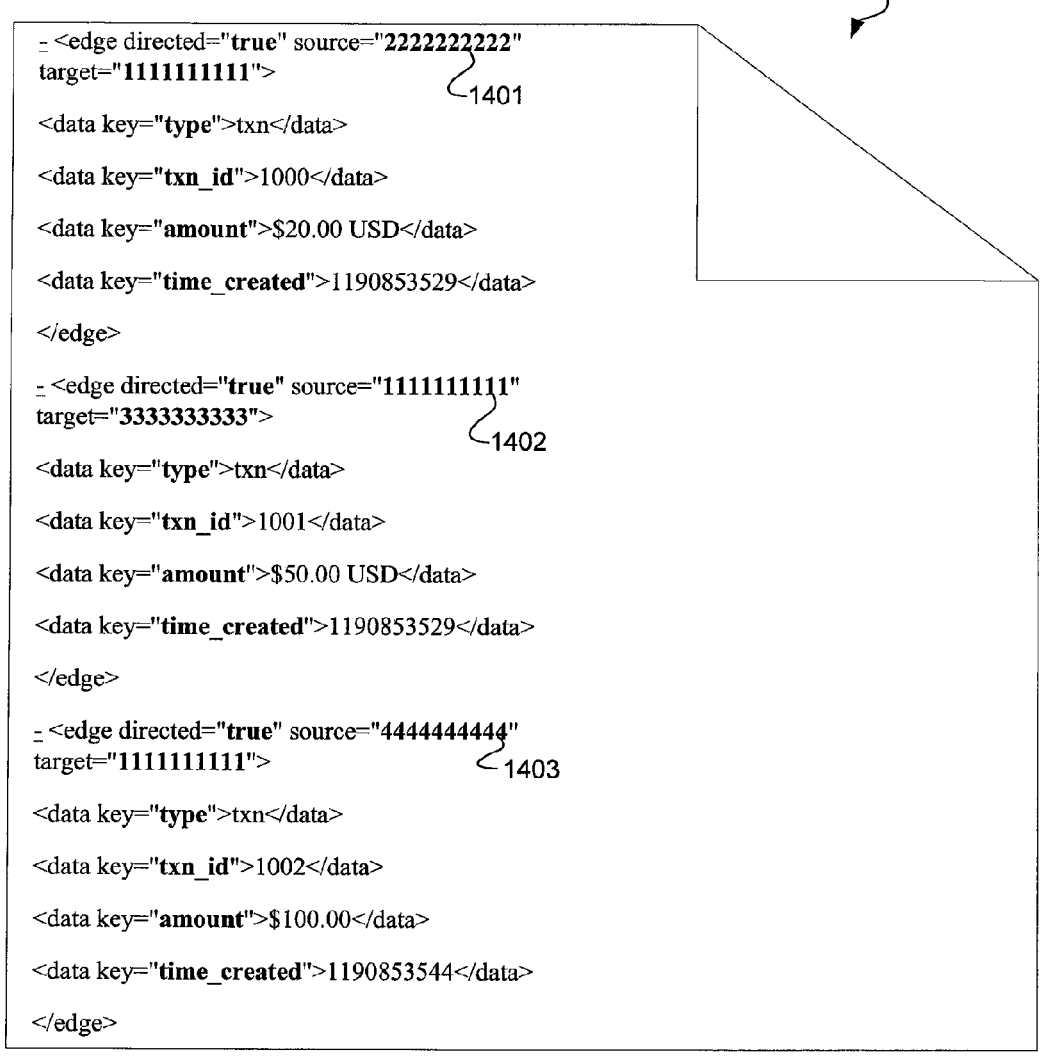
FIG. 14 is a diagram of an XML file, according to an example embodiment, describing data relating to edges connecting nodes.

FIG. 14 is a diagram of an example XML file 1400 describing data relating to edges connecting nodes. This XML file 1400 may be a graph set file that contains relationship data. Shown is a field 1401 that describes an edge that exists between the node identified in field 1302 and the node identified by field 1301. Various data keys may be described by this field 1401 as they relate to this edge, wherein these data keys include, for example, the type of the edge, a text ID relating to an edge, an amount relating to the edge, and the time created value relating to the edge (e.g., collectively referred to as relationship data). A further field 1402 is shown that illustrates an edge connecting the node referenced in field 1301 and the node referenced in field 1303. Again, various additional data keys are provided relating to this edge, wherein these data keys describe, for example, the type of the edge, a text ID value for the edge, the amount in terms of current for the edge, and the time created value for the edge. Further, shown is a field 1403 that illustrates an edge connecting the node described in field 1301 and a further node 4444444444. Again, as a part of this field 1403, a number of data keys were provided where these data keys include a type data key, a text ID data key, an amount data key, and a time created data key.

Example Logic

Figure 15:
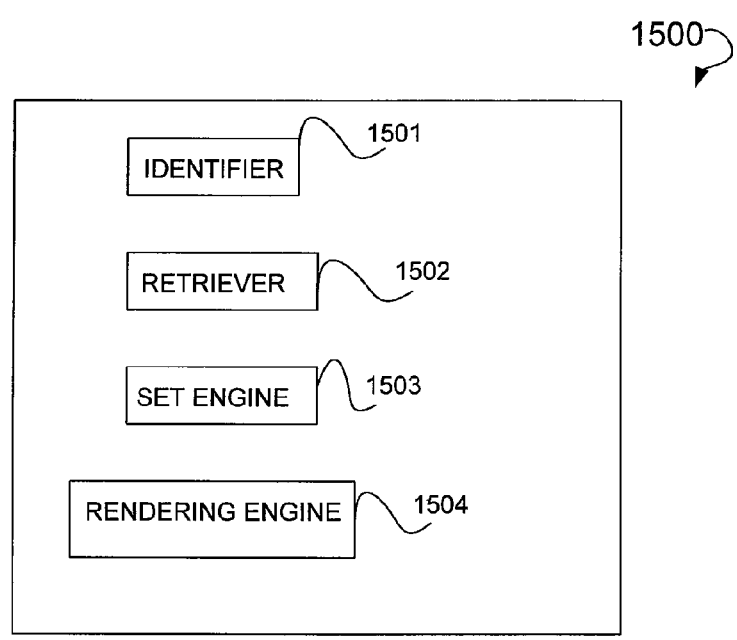
FIG. 15 is a block diagram of various blocks, according to an example embodiment, that may reside as a part of one or more devices, and/or the aggregating server.

FIG. 15 is a block diagram of various blocks that may reside as a part of a computer system 1500. This computer system 1500 may be, for example, the one or more devices 603, and/or the aggregating server 505. In some example embodiments, these blocks may be implemented in hardware, firmware, or software. Illustrated is an identifier 1501 that identifies a context data set that defines a context within which a person resides. This identifier may be an Artificial Intelligence (A.I.) algorithm, or other probability utilizing algorithm. Additionally, this identifier may be the user 601 who identifies the context set using a GUI 602 and associated input devices (e.g., mouse, light pen, keyboard, touch screen). Further, a retriever 1502 is shown, wherein this retriever retrieves a context set data that includes person data and relationship between persons data in the form of edge data. In the alternative, this retriever 1502 may retrieve a context set that includes person data and relationship data. In some example embodiments, these relationships between persons include certain characteristics to define the person and the context set. Also shown is a set engine 1503 that performs some type of set operation on the persons defined in the context set so as to generate a graph set. In the alternative, this set engine 1503 may perform a set operation on the person data and the relationship data to generate a graph set. Person data may include at least one of the following types of data: a unique account identifier value, a social security number, a date of birth, or a physical address value. Relationship data may include at least one of the following types of data geographical location data, an account data, financial institution data, or time of day data. A graph set may include a first set of person data related to a second set of person data through the relationship data. These set operations, as previously referenced, may include, for example, a union operation (U), an intersection operation (∩), a set difference operation (−), a Cartesian product operation (x), or some other suitable set operation. Also shown is a rendering engine 1504 that may render a graphical representation of the context set.

In some example embodiments, the computer system 1500 may implement a graphics engine (not pictured) to generate a graph set file, containing the graph set, the graph set file formatted in at least one of the following file formats: an XML format, or a character delimited flat file format. This graphics engine may contain a parser to parse the graph set file to retrieve the person data and relationship data, a display to display the person data as nodes in a graph, and a display to display the relationship data as at least one edge in the graph. The functionality of this graphics engine may be more fully illustrated below in the discussion of the graphics engine 1608. Additionally, the at least one edge may be a directed edge representing a transaction between the nodes. Further, the at least one edge is colored to represent a specific types of relationship between nodes.

In some example embodiments, identifier 1501 may use data taken from the aggregated transaction database 506 to generate a training set for the purpose of identifying a context data set. This training set may then be used by any number of deterministic algorithms implemented by the identifier 1501. These AI algorithms may include Case-Based Reasoning, Bayesian networks (including Hidden Markov Models), Neural Networks, or Fuzzy Systems. The Bayesian networks may include: Machine Learning Algorithms including-Supervised Learning, Unsupervised Learning, Semi-Supervised Learning, Reinforcement Learning, Transduction, Learning to Learn Algorithms, or some other suitable Bayesian network. The Neural Networks may include: Kohonen Self-Organizing Network, Recurrent Networks, Simple Recurrent Networks, Hopfield Networks, Stochastic Neural Networks, Boltzmann Machines, Modular Neural Networks, Committee of Machines, Associative Neural Network (ASNN), Holographic Associative Memory, Instantaneously Trained Networks, Spiking Neural Networks, Dynamic Neural Networks, Cascading Neural Networks, Neuro-Fuzzy Networks, or some other suitable Neural Network.

In some example embodiments, some type of advanced statistical method or algorithm may be employed by identifier 1501 to identify a context data set. These methods may include the use of Statistical Clusters, K-Means, Random Forests, Markov Processes, or some other suitable statistical method.

Figure 16:
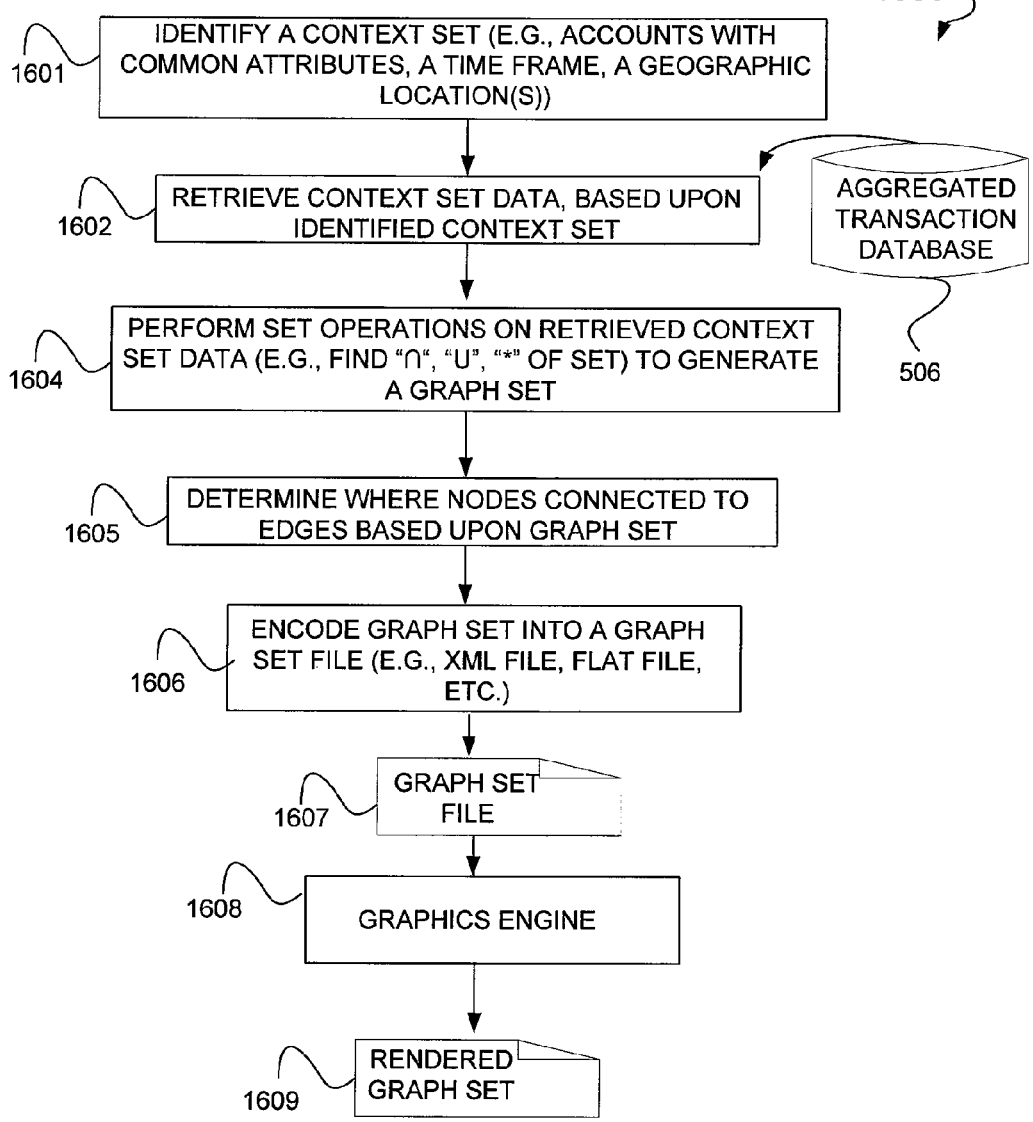
FIG. 16 is a flowchart illustrating a method, according to an example embodiment, used to generate a rendered graph set.

FIG. 16 is a flowchart illustrating an example method 1600 used to generate a rendered graph set. Shown are various operations 1601 through 1606, and an operation 1608. Further, shown is an aggregated transaction database 506. In some example embodiments, an operation 1601 is executed that identifies a common context set. This common context set may, in some example embodiments, to be defined by the user 601 through providing the person identifier 701 via a GUI 602. In some example embodiments, the context set may be a single identifier such as an email address, telephone address, VID, social security number, or some other type of data used to identify a single person. In other example embodiments, an identifier may be used that identifies a plurality of persons residing as a part of the set, where this identifier identifying a plurality of persons may be, for example, common attributes, a time frame during which these persons engaged in certain actions or, for example, a geographical location common to a variety of persons who make up the set. Operation 1601 may also implement an A.I. algorithm, or other probability utilizing algorithm to identify a context data set. An operation 1602 is also shown that when executed receives a context set data from the aggregated transaction database 506. This context set data (e.g., context set) may include person data and relationship data. Further, this operation 1602 may utilize SQL or MDX to retrieve the context set data. Additionally, this context set data may describe relations between nodes based upon, for example, the transaction data 108, the banking data 208, the telecom data 308 and/or the Internet data 408. In some example embodiments, some other type of data may be utilized to show a relationship between nodes.

In some example embodiments, an operation 1604 may be executed that performs some type of set operation in order to retrieve context set data so as to generate a graph set. Further, this operation 1604 may perform a set operation on the person data and the relationship data to generate a graph set. These various set operations (e.g., "U", "∩", "x", and/or "−"), as described elsewhere, may be utilized to show relationships between nodes (e.g., members of the retrieved context set). In some example embodiments, an operation 1605 may be executed to determine where nodes are connected to edges based upon the graph set. In some example embodiments, operation 1605 is executed to actually establish edges between nodes based upon various transactions (e.g., 108, 208, 308 and/or 408). Further, an operation 1606 may be executed that may, for example, encode the graph set into a graph set file where this graph set file may be, for example, an XML based file or a character-delimited flat file. Additionally, this operation 1606 may generate a graph set file. Examples of this graph set file are reflected in FIGS. 13 and 14, and the XML files 1300 and 1400 illustrated therein. In some example embodiments, these XML files 1300 and 1400 may be combined into a single graph set file 1607. This graph set file 1607 may be processed by, for example, a graphics engine 1608. In some example embodiments, as a result of the execution of graphic engine 1608, a rendered graph set 1609 may be generated. This rendered graph set 1609 may, for example, be generated and transmitted in real time or near real time. Further, this rendered graph set 1609 may be considered to be akin to the rendered graph set 609 previously referenced and described.

A first set of persons who make phone calls between 4:00 am and 6:00 am may be provided by the telecom site 306 as a telecom site data packet 503 to be stored into the aggregated transaction database 506. For example, a first set is provided by the telecom site 306 of all persons who make phone calls between 4:00 am and 6:00 am. A second set is also provided containing all persons who are still on the phone at 6:01 am. The first set ($S_1$) contains member A, B, C, and D. The second set ($S_2$) contains member B, and C. Taking the intersection of $S_1$ and $S_2$ ($S_1 \cap S_2$), one can determine which person phone calls continued past 6:01 am (e.g., B and C). B and C then have a relationship in the form of an edge, where this edge represents persons who were on the phone past 6:01 am.

In some example embodiments, operation 1601, when executed, may use data taken from the aggregated transaction database 506 to generate a training set for the purpose of identifying a context data set. This training set may then be used by any number of deterministic algorithms implemented by the operation 1601. These AI algorithms may include Case-Based Reasoning, Bayesian networks (including Hidden Markov Models), Neural Networks, or Fuzzy Systems. The Bayesian networks may include: Machine Learning Algorithms including-Supervised Learning, Unsupervised Learning, Semi-Supervised Learning, Reinforcement Learning, Transduction, Learning to Learn Algorithms, or some other suitable Bayesian network. The Neural Networks may include: Kohonen Self-Organizing Network, Recurrent Networks, Simple Recurrent Networks, Hopfield Networks, Stochastic Neural Networks, Boltzmann Machines, Modular Neural Networks, Committee of Machines, Associative Neural Network (ASNN), Holographic Associative Memory, Instantaneously Trained Networks, Spiking Neural Networks, Dynamic Neural Networks, Cascading Neural Networks, Neuro-Fuzzy Networks, or some other suitable Neural Network.

In some example embodiments, some type of advanced statistical method or algorithm may be employed by the operation 1601 to identify a context data set. These methods may include the use of Statistical Clusters, K-Means, Random Forests, Markov Processes, or some other suitable statistical method.

Some example embodiments may include, the graphics engine 1608 performing a number of operation. These operations may include parsing the graph set file to retrieve the person data and relationship data. This parsing may be based upon some predefined grammar as dictated by, for example, an XSD or DTD. This person data may then be displayed as a node or nodes in a graph. The relationship data may then be displayed as displaying the relationship data as at least one edge in the graph.

Example Storage

Some embodiments may include the various databases (e.g., 107, 207, 307, 407, and 506) being relational databases, or in some cases On-Line Analytical Processing (OLAP) based databases. In the case of relational databases, various tables of data are created and data is inserted into, and/or selected from, these tables using SQL, or some other database-query language known in the art. In the case of OLAP databases, one or more multi-dimensional cubes or hypercubes containing multidimensional data from which data is selected from or inserted into using MDX may be implemented. In the case of a database using tables and SQL, a database application such as, for example, MYSQL™, SQLSERVER™, Oracle 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

Figure 17:
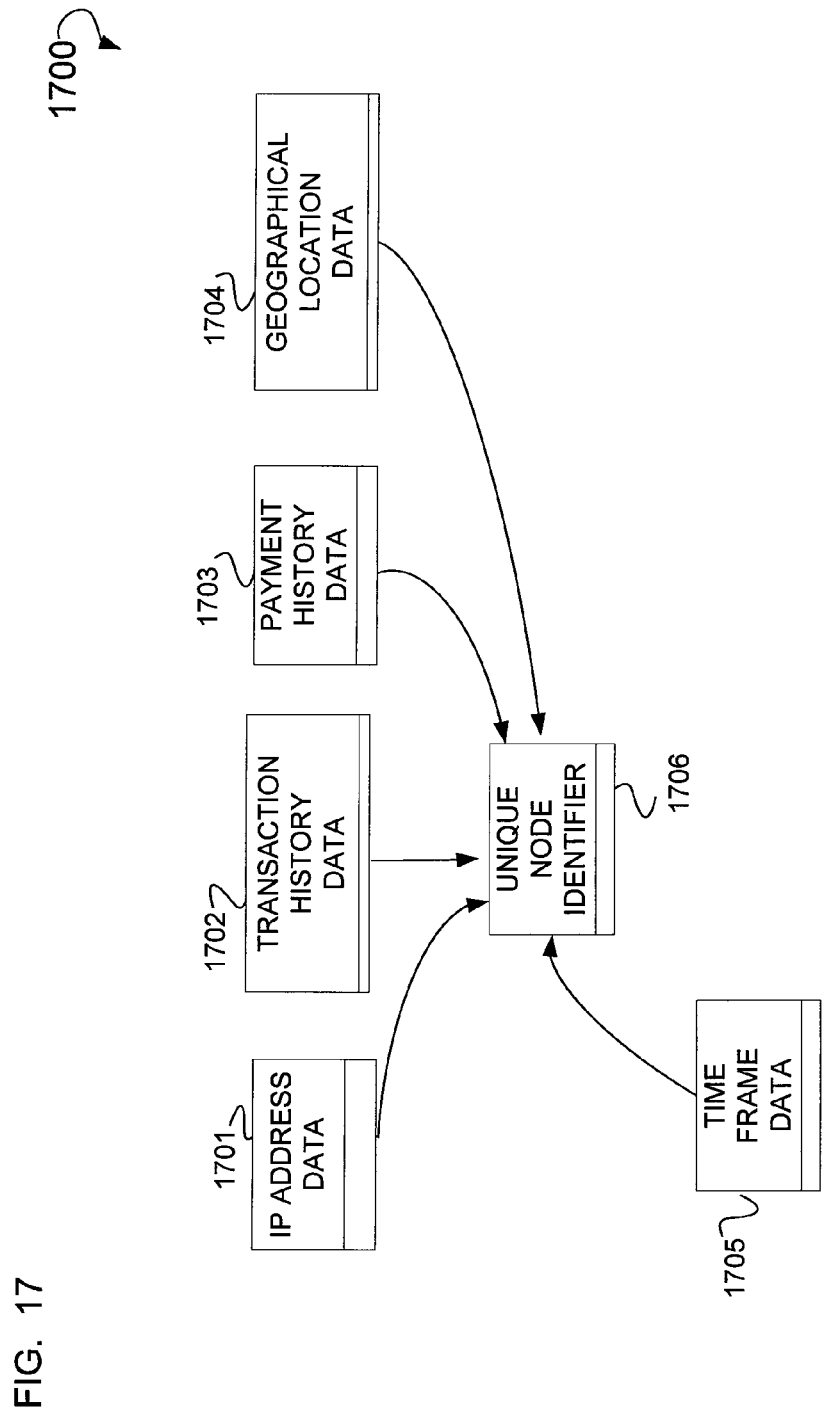
FIG. 17 is a diagram of a Relational Data Schema (RDS), according to an example embodiment, illustrating various data tables that may be used and implemented as a part of the aggregated transaction database.

FIG. 17 is a diagram of an example RDS 1700 illustrating various data tables that may be used and implemented as a part of, for example, the aggregated transaction database 506. Shown is the table 1701 that contains IP address data. This IP address data may be stored as, for example, a string, integer, or float data type. The address may represent IP addresses used to send Internet data 408 between one or more users such as, for example, user 401 and user 405. This IP address data may, in some example embodiments, be utilized to establish an edge between nodes representing user 401 and user 405. In some example embodiments, the table 1702 is shown that contains transaction history data. In some example embodiments, this transaction history data may be, for example, the transaction data 108 representing the transaction of goods or services between, for example, a user 101 and user 105. In some example embodiments, this user 101 and 105 may be represented as nodes and the transaction history data representing an edge between these nodes where this edge may be, for example, a directed edge. In some example embodiments, the data stored in the transaction history data may be, for example, data relating to the amount of the transaction, using a currency, integer, float, or some other suitable data type. Some example embodiments may include table 1702 storing date information, (e.g., the date of the transaction) wherein a date data type or some other suitable data type is utilized.

Some example embodiments may include, a table 1703 that shows payment history data where this payment history data may, be for example, banking data 208 previously referenced. This table 1703 may store this payment history data in the form of, for example, a date data type reflecting a date of a payment, a currency data type to reflect the amount of a payment or, for example, an integer or float data type to further reflect the amount of a payment. Table 1704 represents geographical location data, wherein this geographical location data may be, for example, a street address stored as a string or some other suitable data type. Further, an IP address may be stored as an integer, float, or some other suitable data type. Additionally, the table 1704 may store longitude and latitude data values stored as, for example, a string data type, or some other suitable form of data used to represent the geographical location of one or more users. These users may include, for example, users 101, 105, users 201, 205, users 301, 305, or users 401 and 405. Also shown, is a table 1705 that contains timeframe data. In some example embodiments, a timeframe may be used as a basis to establish a relationship between persons represented as nodes in a graph. Contained within this table 1705 may be a time data type used to format, for example, data relating to a particular period of time. Other suitable data types may include, for example, a string, integer or float which may also be used to represent a particular timeframe. Further shown is a table 1706 that contains a unique node identifier value to uniquely identify one or more nodes associated with the data contained in tables 1701 through 1705. In some example embodiments, in lieu of, or in addition to, the various data and associated data types contained in each of the table 1701 through 1705, data formatted using XML may also be contained in any one of these tables 1701 through 1705.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some cases, one or more of these tiers may be collapsed into another, resulting in a two-tier architecture or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above illustrated tiers, and processes or operations that make them up, as being written as one or more software components. The ability to generate, use, and manipulate data is common to many of these components. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (JEB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques and can be written in the same programming language or a different programming language. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

FIG. 18 shows a diagrammatic representation of a machine in the example form of a computer system 1800 that executes a set of instructions to perform any one or more of the methodologies discussed herein. One of the devices 102 may be configured as a computer system 1800. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both performing tasks such as those illustrated in the above description.

The example computer system 1800 includes a processor 1802 (e.g., a Central Processing Unit (CPU), a Graphics Processing Unit (GPU) or both), a main memory 1804, and a static memory 1806, which communicate with each other via a bus 1808. The computer system 1800 may further include a video display unit 1810 (e.g., a Liquid Crystal Display (LCD) or a Cathode Ray Tube (CRT)). The computer system 1800 also includes an alpha-numeric input device 1812 (e.g., a keyboard), a GUI cursor controller 1814 (e.g., a mouse), a disk drive unit 1816, a signal generation device 1818 (e.g., a speaker) and a network interface device (e.g., a transmitter) 1820.

The drive unit 1816 includes a machine-readable medium 1822 on which is stored one or more sets of instructions 1824 and data structures (e.g., software) embodying or used by any one or more of the methodologies or functions illustrated herein. The software may also reside, completely or at least partially, within the main memory 1804 and/or within the processor 1802 during execution thereof by the computer system 1800, the main memory 1804 and the processor 1802 also constituting machine-readable media.

The instructions 1824 may further be transmitted or received over a network 1826 via the network interface device 1820 using any one of a number of well-known transfer protocols (e.g., HTTP, Session Initiation Protocol (SIP)).

The term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more methodologies illustrated herein. The term "machine-readable medium" shall accordingly be taken to include, but not be limited to, solid-state memories, optical and magnetic media, and carrier wave signals.

Marketplace Applications

In some example embodiments, a system and method is disclosed that allows individuals to graphically display graphs containing nodes and edges. The nodes may present persons, and the edges may represent relationships between these persons. Some example embodiments may include expanding a node as represented in graph UI so as to display additional data regarding a node(s) and the edges that may connect a node(s). The additional data may include the specific details relating to the nature of the edge (e.g., transaction) between two nodes. Higher levels of granularity may be able to be displayed via the additional data.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
 receiving, from a user, a selection of a person and one or more relationships; to identify a context set within which the person may participate in transactions with one of a plurality of other persons;
 retrieving, using one or more processors, data packets aggregated from a number of sources transmitted over a network, to generate context set data that includes person data and transaction data based on the context set;
generating, using one or more processors, a graph set by performing at least one set operation on the context set data;
generating, using one or more processors a graph set file including graph set data by encoding the graph set; and
rendering, using one or more processors, the graph set data into a visual format for display to the user, the visual format having a cluster with a star topology, the star topology having a center node representing the selected person and a plurality of peripheral nodes, the plurality of the peripheral nodes generated based on at least a portion of the context data, each node of the plurality of peripheral nodes representing the one of the plurality of other persons and connected to the center node via an edge, the edge representing the transaction involving the selected person and the one of the plurality of other persons.

2. The method of claim 1, wherein the person data includes at least one of the following types of data: a unique account identifier value, a social security number, a date of birth, or a physical address value.

3. The method of claim 1, wherein the set operation includes at least one of the following operations: a union operation, an intersection operation, a set difference operation, a Cartesian product operation, or a join operation.

4. The method of claim 1, wherein the graph set file is formatted in at least one of the following file formats: an eXtensible Markup Language (XML) format, or a character delimited flat file format.

5. The method of claim 1, wherein the at least one edge is assigned a color to represent a specific type of relationship between nodes.

6. The method of claim 1, further comprising receiving a selection of a type of transaction data from the user wherein the retrieving of the context set is limited to transaction data associated with the selected type of transaction.

7. The method of claim 1, wherein the transaction data includes at least one of the following types of transaction data: commerce transaction data, banking data, telecomm data, and Internet data.

8. The method of claim 1, wherein the center node is associated with at least one of the follow types of data pertaining to the selected person: name, account status, last login information, account number, account balance, country information, email address, and account creation time.

9. The method of claim 1, wherein each node of the plurality of the peripheral nodes is associated with at least one of the follow types of data pertaining to one of the plurality of the other persons: name, account status, last login information, account number, account balance, country information, email address, and account creation time.

10. A system comprising:
a machine having a memory and at least one processor;
an identifier component configured to receive, from a user, a selection of a person and one or more relationships to identify a context set within which the person may participate in transactions with one of a plurality of other persons;
a retriever component, executable by the at least one processor, configured to retrieve data packets aggregated from a number of sources transmitted over a network, to generate context set data that includes person data and transaction data, the transaction data based on the context set;
a set engine, executable by the at least one processor, configured to generate a graph set by performing at least one a set operation on the context set data;
a graphics engine, executable by the at least one processor, configured to generate a graph set file including graph set data by encoding the graph set; and
a rendering engine, executable by the at least one processor, configured to render the graph set data into a visual format for display to the user, the visual format having a cluster with a star topology, the star topology having a center node representing the selected person and a plurality of peripheral nodes, the plurality of the peripheral nodes generated based on at least a portion of the context data, each node of the plurality of peripheral nodes representing the one of the plurality of other persons and connected to the center node via an edge, the edge representing the transaction involving the selected person and the one of the plurality of other persons.

11. The system of claim 10, wherein the person data includes at least one of the following types of data: a unique account identifier value, a social security number, a date of birth, or a physical address value.

12. The system of claim 10, wherein the set operation includes at least one of the following operations: a union operation, an intersection operation, a set difference operation, a Cartesian product operation, or a join operation.

13. The system of claim 10, wherein the graph set file is formatted in at least one of the following file formats: an eXtensible Markup Language (XML) format, or a character delimited flat file format.

14. The system of claim 10, wherein the at least one edge is assigned a color to represent a specific type of relationship between nodes.

15. The system of claim 10, further comprising receiving a selection of a type of transaction data from the user wherein the retrieving of the context set is limited to transaction data associated with the selected type of transaction.

16. The system of claim 10, wherein the transaction data includes at least one of the following types of transaction data: commerce transaction data, banking data, telecomm data, and internet data.

17. The system of claim 10, wherein the center node is associated with at least one of the follow types of data pertaining to the selected person: name, account status, last login information, account number, account balance, country information, email address, and account creation time.

18. The system of claim 10, wherein each node of the plurality of the peripheral nodes is associated with at least one of the follow types of data pertaining to one of the plurality of the other persons: name, account status, last login information, account number, account balance, country information, email address, and account creation time.

19. A non-transitory machine-readable medium comprising instructions, which when executed by one or more machines cause the one or more machines to perform a method comprising:
receiving, from a user, a selection of a person and one or more relationships; to identify a context set within which the person may participate in transactions with one of a plurality of other persons;
retrieving, using one or more processors, data packets aggregated from a number of sources transmitted over a network, to generate context set data that includes person data and transaction data based on the context set;
generating, using one or more processors, a graph set by performing at least one set operation on the context set data;

generating, using one or more processors, a graph set file including graph set data by encoding the graph set; and rendering, using one or more processors, the graph set data into a visual format for display to the user, the visual format having a cluster with a star topology, the star topology having a center node representing the selected person and a plurality of peripheral nodes, the plurality of the peripheral nodes generated based on at least a portion of the context data, each node of the plurality of peripheral nodes representing the one of the plurality of other persons and connected to the center node via an edge, the edge representing the transaction involving the selected person and the one of the plurality of other persons.

\* \* \* \* \*

UNITED STATES PATENT AND TRADEMARK OFFICE
CERTIFICATE OF CORRECTION

| | | |
|---|---|---|
| PATENT NO. | : 8,791,948 B2 | Page 1 of 1 |
| APPLICATION NO. | : 11/961817 | |
| DATED | : July 29, 2014 | |
| INVENTOR(S) | : Patil et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this
Twenty-seventh Day of October, 2015

Michelle K. Lee
*Director of the United States Patent and Trademark Office*